Nov. 6, 1962  W. P. SIEGEL ET AL  3,062,163
SHUTTLE EMBROIDERY MACHINE AND CONTROL
Filed Dec. 7, 1959  10 Sheets-Sheet 1

INVENTORS
WALTER P. SIEGEL
EDWIN A. THALER
BY
Ameter & Levy
ATTORNEYS

INVENTORS
WALTER P. SIEGEL
EDWIN A. THALER
BY
Amster + Levy
ATTORNEYS

Nov. 6, 1962  W. P. SIEGEL ET AL  3,062,163
SHUTTLE EMBROIDERY MACHINE AND CONTROL
Filed Dec. 7, 1959  10 Sheets-Sheet 4
FIG. 6.
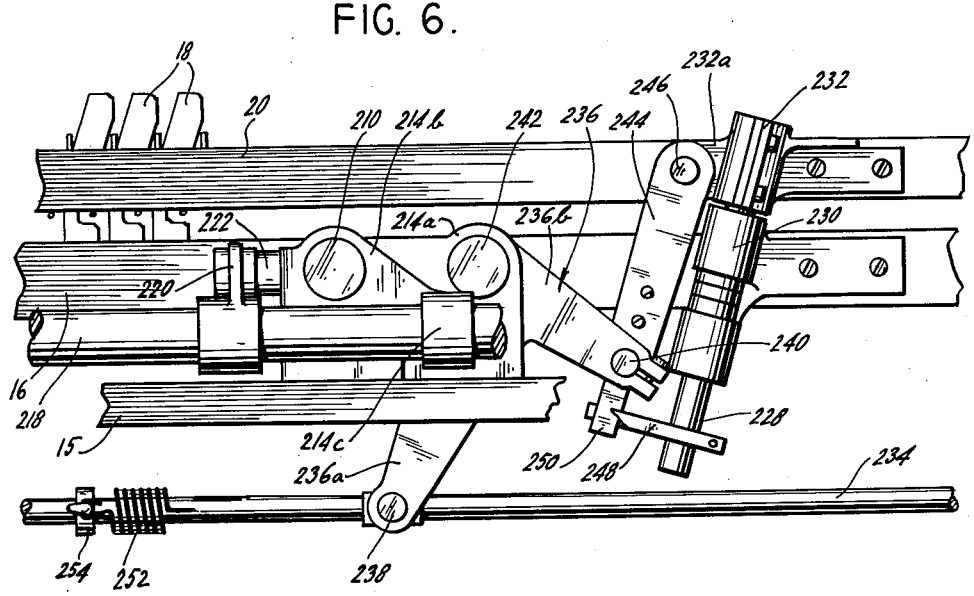
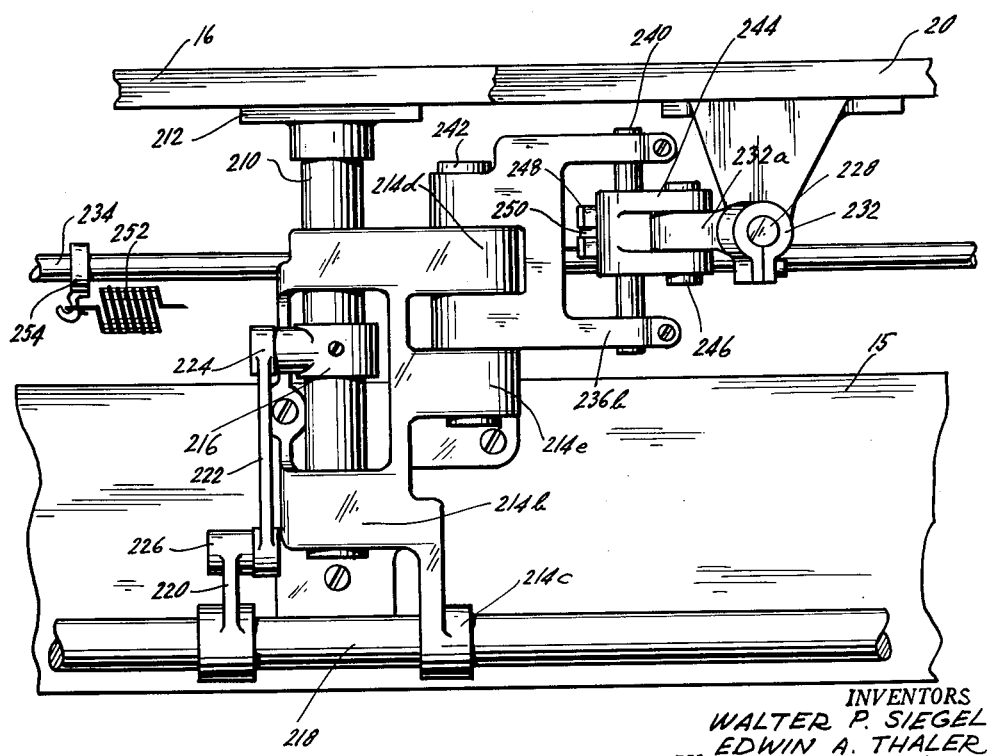
FIG. 7.
INVENTORS
WALTER P. SIEGEL
EDWIN A. THALER
BY Amster + Levy
ATTORNEYS Nov. 6, 1962   W. P. SIEGEL ET AL   3,062,163
SHUTTLE EMBROIDERY MACHINE AND CONTROL
Filed Dec. 7, 1959   10 Sheets-Sheet 5

INVENTORS
WALTER P. SIEGEL
EDWIN A. THALER
BY Amster + Levy
ATTORNEYS

Nov. 6, 1962 W. P. SIEGEL ET AL 3,062,163
SHUTTLE EMBROIDERY MACHINE AND CONTROL
Filed Dec. 7, 1959 10 Sheets-Sheet 6
FIG. 10.
FIG. 9.
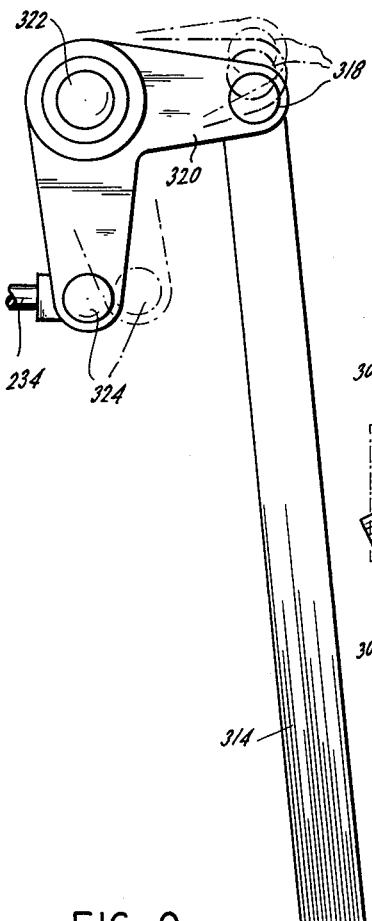
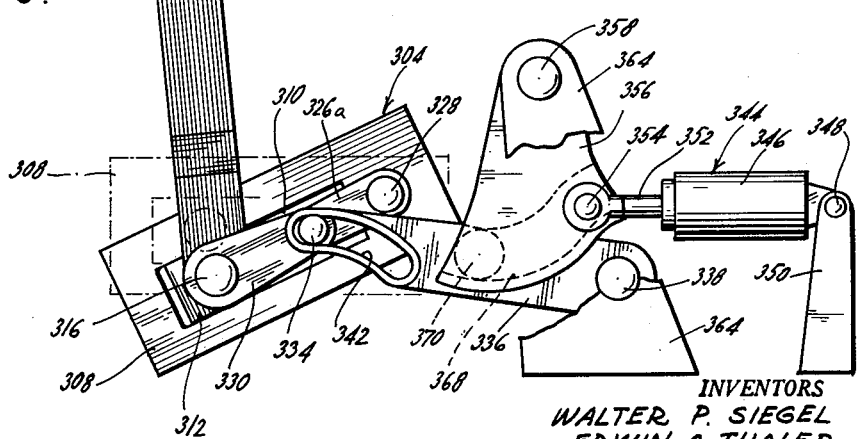
INVENTORS
WALTER P. SIEGEL
BY EDWIN A. THALER
Amster + Levy
ATTORNEYS Nov. 6, 1962 W. P. SIEGEL ET AL 3,062,163
SHUTTLE EMBROIDERY MACHINE AND CONTROL
Filed Dec. 7, 1959 10 Sheets-Sheet 7

INVENTOR.
WALTER P. SIEGEL
BY EDWIN A. THALER

Amster + Levy
ATTORNEYS

Nov. 6, 1962 W. P. SIEGEL ET AL 3,062,163
SHUTTLE EMBROIDERY MACHINE AND CONTROL
Filed Dec. 7, 1959 10 Sheets-Sheet 8
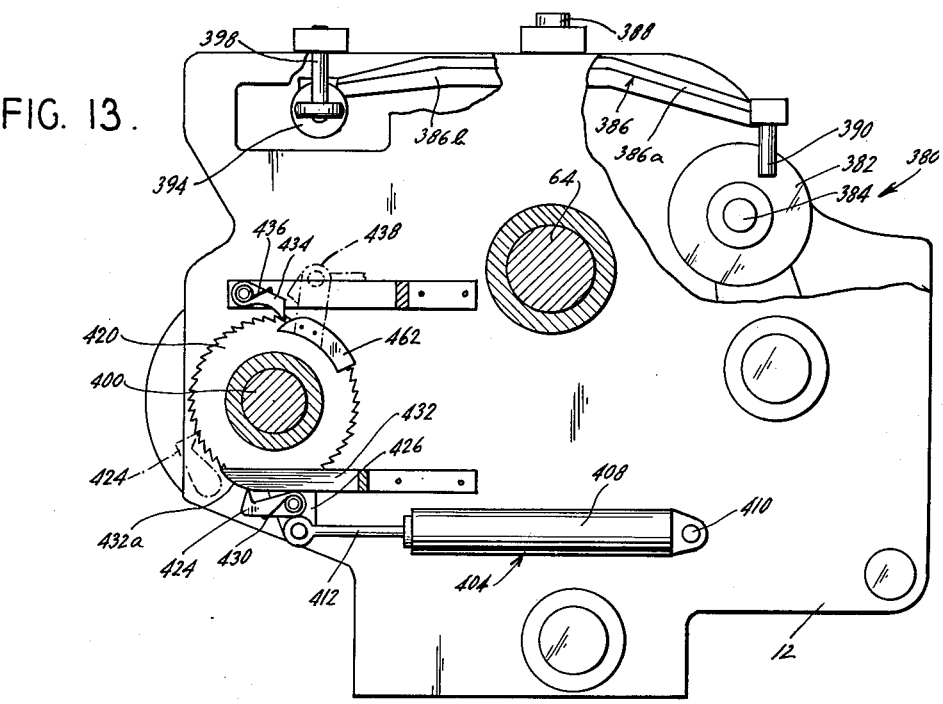
FIG. 13.
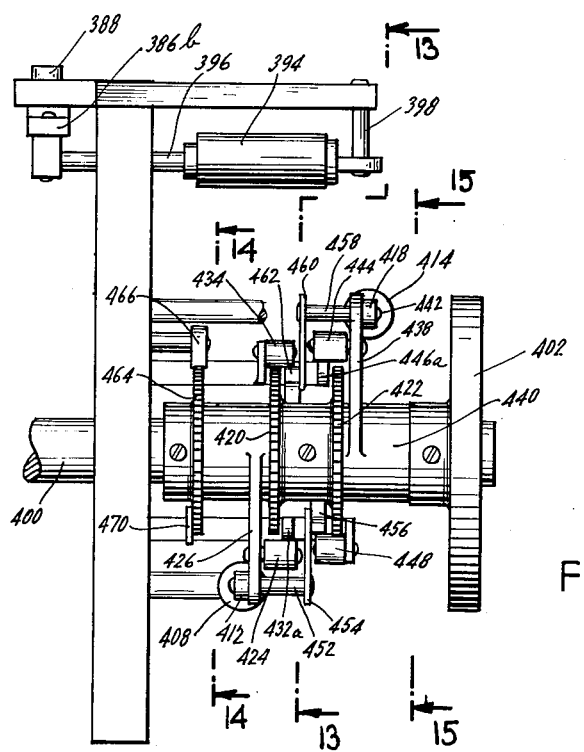
FIG. 14.
FIG. 12.
INVENTORS
WALTER P. SIEGEL
EDWIN A. THALER
BY Amster + Levy
ATTORNEYS Nov. 6, 1962  W. P. SIEGEL ET AL  3,062,163
SHUTTLE EMBROIDERY MACHINE AND CONTROL
Filed Dec. 7, 1959  10 Sheets-Sheet 10

United States Patent Office 3,062,163
Patented Nov. 6, 1962

3,062,163
SHUTTLE EMBROIDERY MACHINE
AND CONTROL
Walter P. Siegel, Paramus, and Edwin A. Thaler, Union City, N.J., assignors to Robert Reiner, Incorporated, Weehawken, N.J., a corporation of New Jersey
Filed Dec. 7, 1959, Ser. No. 857,696
22 Claims. (Cl. 112—86)

The present invention relates generally to embroidery machines, and in particular to an improved shuttle type of embroidery machine and control system for such machine.

The well known shuttle embroidery machine includes a common gatter frame upon which is mounted two wagons arranged in tandem one above the other. Each of the wagons includes a supply tube upon which there is wound a supply of material to be embroidered and a further tube upon which the embroidered material is wound, the material being stretched between the tubes during the embroidering operation. The gatter frame is shiftable both vertically and horizontally such that the material may be displaced in a complex path determined by the automatic control for the machine. The embroidery mechanisms are arranged at relatively stationary locations in relation to the respective wagons and each includes a needle rail at the needle side of the material having a series of needles fixed at spaced locations along the length thereof each of which is fed from a supply of needle thread. A shuttle box rail is provided at the shuttle side of the material which carries a series of longitudinally spaced shuttle boxes corresponding to each of the needles, which shuttle boxes contain shuttles having bobbins therein providing the supply of shuttle thread for the respective needle threads. Further, at the needle side of the material there is provided a boring point rail which is provided at spaced locations along its length with a number of boring points which, at prescribed intervals during the machine operation, are effective to cut holes in the cloth. Mechanisms are provided for driving the needle rail through a stitch-forming stroke such that the needle threads are passed through the material and form loops through which the respective shuttles are passed causing the shuttle thread to loop through the needle threads, as is generally understood. For certain patterns the boring point rail is operated during the machine cycle to cut the material, and in such instances the holes so cut are bound by the action of the cooperating needles and shuttles.

The needle thread is fed to the respective needles over a yarn tensioning and controlling system which includes, in succession from the supply of the needle thread, a short stroke thread carrier and a long stroke thread carrier. The short and long stroke thread carriers are effective as the needles move through the forward or stitch-forming strokes to initially deliver the needle threads substantially free of tension, to then form a loop through which the shuttles pass as the needles begin to retract, and finally to pull back on the needle threads to complete the stitches.

From the foregoing, it will be appreciated that a control system which is to achieve the requisite coordinated movements of the needles, shuttles, boring points and thread carriers must, of necessity, be relatively complicated. In addition to the need for engaging and disengaging the needles, shuttles, boring points and thread carriers respectively, it is further necessary during the machine cycle to change the speed of the machine, to control the depth of the penetration of the boring points, and to shift the gatter frame both horizontally and vertically. The control system should be very flexible for the machine should be sufficiently versatile to handle the different types of embroidery patterns which are required from day to day. The control problem is still further complicated in that practical commercial versions of these machines are relatively large, usually of a length sufficient to handle approximately 15 yards in width of cloth. Due to the length of the machine, it is often necessary to duplicate the actuating mechanisms for the stitching tools at spaced locations along the length of the machine. Each of such actuating mechanisms must be controlled and coordinated into the overall machine cycle.

It is generally known to coordinate the various actuating mechanisms and controls of the shuttle embroidery machine from a common automat of typical Jacquard construction. The automat is generally characterized as including a continuous roll of paper or similar material, known as a punching or control tape, which is punched at longitudinal spaced locations and in a number of side by side rows in accordance with the several control functions which are to be sensed and directed to the actuating mechanisms of the embroidery machine. The control functions are sensed through the provision of platinen which penetrate through the holes in the punching and mechanically establish the control functions in the order in which they are read out of the punching. The punching indexes for each stitch thereby providing a continuous read-out of control information to the embroidery machine.

Difficulties have been experienced with the use of mechanical controls for reading out the information from the automat and performing the necessary related functions in the embroidery machine, and in interlocking these functions to assure perfect sequencing of the numerous mechanisms of the embroidery machine. This may be contributed in part to the relatively high order of sensitivity of the automat on the one hand, and the rather large mass involved in the mechanical controls for the embroidery machine. Usually, it is necessary to employ rather lengthy mechanical linkages with the attendant play, high inertia and friction inherent in such linkages. Further, a high order of precision is required in the mechanical linkages, with the need for rigid servicing to avoid malfunctioning. Thus there has been a limitation as to the speed of operation of the embroidery machine and it has not been practical to increase the speed of operation of the machine to obtain increased productivity at lower cost in that such mechanical controls have been found to be highly critical at increased speeds.

With the relatively recent advent of essentially electrically and electronic controls for various types of automatic equipment, some thought has been given to replacing the mechanical controls by electrical counterparts, with a view to possibly attaining high speed operation, more economical production and greater reliability. However, electrical controls systems, although generally feasible, are not necessarily practical in that they present problems of wear, heating and relative inflexibility in relation to the mechanisms employed in the embroidery machine. For example, if solenoid controls were used to perform the engaging and disengaging functions for the stitching tools including the needles, shuttles and boring points, such solenoid controls would have experienced many millions of operations in relatively short order and would be subject to mechanical wear far in excess of that contemplated for commercially available units. Further, such solenoid controls, if operated at the frequency required to perform the automatic functions for an embroidery machine, would generate excessive heat and noise, with the attendant disadvantages. Hydraulic systems have been examined and generally are not capable of responding to the speeds required for automation of embroidery machines.

Broadly, it is an object of the present invention to provide an improved control system for an embroidery machine which obviates one or more of the aforesaid difficulties. Specifically, it is within the contemplation of the present invention to provide a control system which exhibits the characteristics required to achieve the coordinated functions of an embroidery machine, yet is inherently compatible with such embroidery machines and their operational environment.

It is a further object of the present invention to provide a control system for an embroidery machine which may be employed with the conventional punchings or control tapes heretofore employed in the field and designed to operate with automats constructed according to the Plauen or Zahn systems. Advantageously, an embroidery machine according to the present invention may be used by a manufacturer with its present stock of punchings thereby avoiding the necessity of replacing the pattern-forming control punchings and/or the basic read-out mechanisms of the automat.

We have found that an essentially pneumatic and electrically responsive control system is capable of responding to the read-out from punchings prepared and designed according to the Plauen or Zahn systems and may be employed to control the mechanisms of the embroidery machine with a high order of reliability and at appreciably increased operating speeds. Advantagenously, the productivity of the machines may be substantially increased without sacrificing quality, in most instances enabling the realization of more perfect embroidery work, with the need for less servicing and down time for the machine. In that these machines are inherently complex, large in size and require many hours of time for setting up, even slight increases in speed and reliability are appreciable in realizing cost saving. For example, in a typical machine, there may be as many as one thousand needles which must be threaded preliminary to running any given pattern, and which may have to be re-threaded in the event of malfunctioning of the machine during any manufacturing run.

In accordance with an illustrative embodiment demonstrating features and objects of the present invention, there is provided an automatic shuttle embroidery machine which comprises a support, a stitching tool, means mounting the stitching tool on the support for movement through a work cycle, and actuating and control mechanisms for moving said stitching tool. These mechanisms include an actuating shaft rotatably mounted on the support and carrying an actuating cam having actuating surfaces. A further cam is disposed adjacent to the actuating cam and is provided with camming surfaces coinciding with a portion of the camming surfaces of the actuating cam. A cam follower is mounted for side to side shifting movement between positions in engagement respectively with the actuating cam and the further cam. Electrically responsive follower shift means are operatively connected to the cam follower and means including a remote control electric sensing element adapted to respond to a punching are provided for activating the follower shift means. Accordingly, in response to the activation of the electric sensing element, the cam follower may be shifted into and out of engagement with the actuating cam in accordance with the desired operating cycle for the embroidery machine. Advantageously, the stitching tool may take the form of a needle which is mounted for reciprocation through a stitch-forming stroke, a boring point which is mounted for reciprocation through a boring stroke, or a thread carrier which is mounted for movement through a tensioning cycle.

For the commercial acceptance of a shuttle embroidery machine of modified design, it is a rather important requirement that the existing punchings or control tapes be usable in the modified machine, for otherwise long-standing users of this type of machine would be required to re-make a large number of punchings in order to be able to employ the modified machine. However, existing punchings were particularly created to be employed in an essentially mechanical control system. Although it would be possible to merely substitute, for each mechanical function derived from a particular hole in a punching, its electrical counterpart, such substitution would not take advantage of the much greater flexibility, versatility and safety which can be realized with essentially electrically controlled and interlocked mechanisms.

Accordingly, it is a further object of the present invention to provide an improved electrically responsive control system for a shuttle embroidery machine which enables the use of pre-existing control tapes or punchings. Specifically, it is within the contemplation of the present invention to provide a control system which is capable of deriving more than one sensing function from one hole on a cotrol tape or punching such that the machine may be more accurately and reliably controlled, adjusted, and protected against malfunction.

In accordance with this aspect of the present invention, the actuating shaft for the machine drives a timing shaft which makes one revolution for each two revolutions of the actuating shaft. The timing shaft, during alternate cycles of its operation, is effective to alternately condition different control circuits to respond to one series of holes sensed by one of the platinen of the automat such that any one series of holes may be employed during successive cycles of the timing shaft for interrelating the rather complex functions of the several control circuits of the embroidery machine.

The above brief description, as well as further objects, features, and advantages of the present invention will be more fully appreciated by reference to the following detailed description of a presently preferred, but illustrative embodiment in accordance with the present invention, when taken in conjunction with the accompanying drawings, wherein:

FIG. 6 is a fragmentary rear elevational view of a part of the shuttle embroidery machine showing the details of the actuating and controlling mechanisms for the shuttle box rail;

FIG. 7 is a plan view taken on FIG. 6;

FIG. 9 is a rear elevational view taken in the direction of the directional arrow 9 in FIG. 8 showing further details of the shuttle drive;

FIG. 10 is a fragmentary rear elevational view showing an adjusted position for the shuttle actuating and controlling mechanisms illustrated in FIG. 9;

FIG. 12 is a rear elevational view of the bore stroke control mechanisms;

FIG. 13 is a sectional view, taken substantially along the line 13—13 of FIG. 12 and looking in the direction of the arrows;

FIG. 14 is a fragmentary sectional view, taken substantially along the line 14—14 of FIG. 12 and looking in the direction of the arrows;

Figure 1:
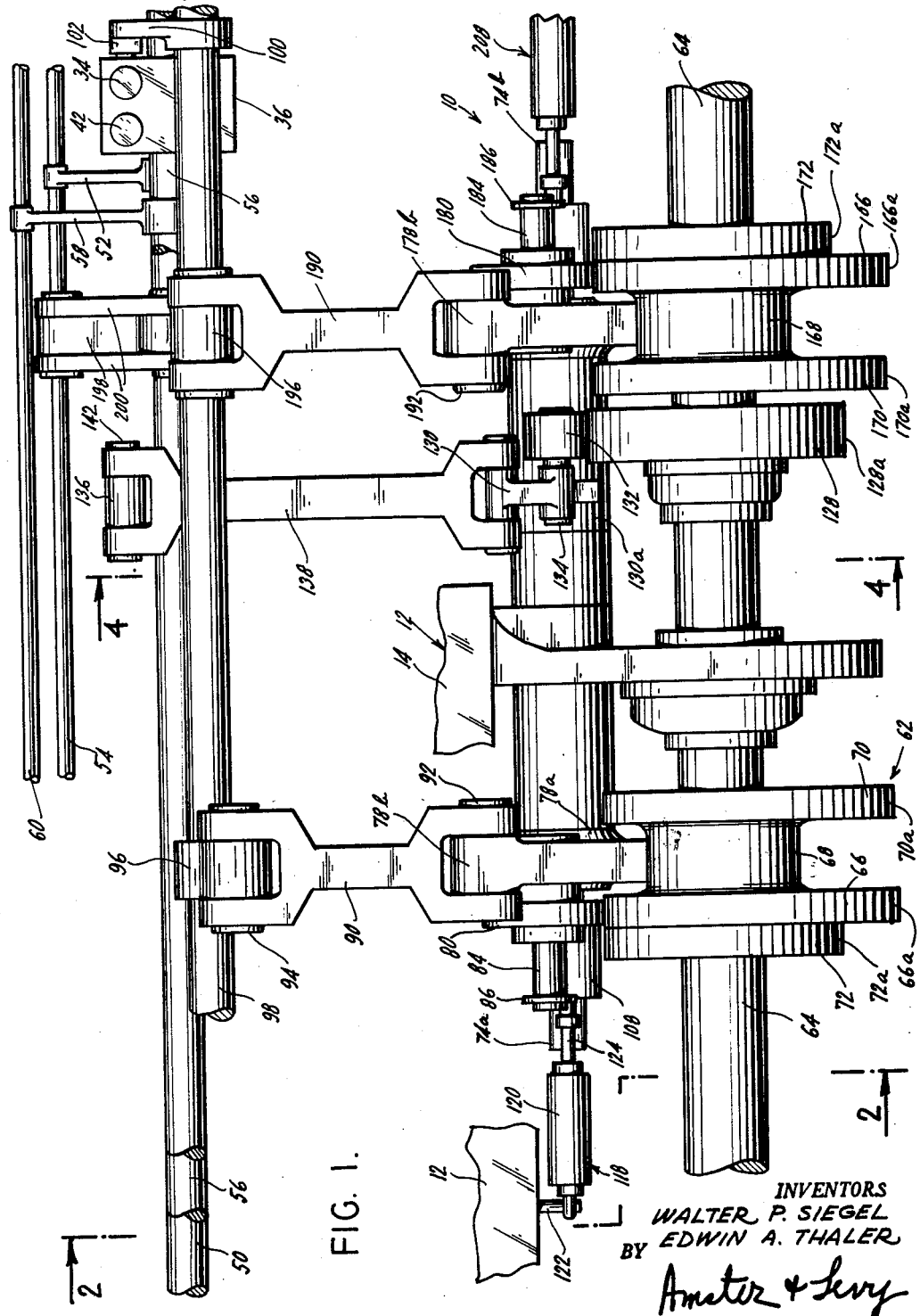
FIG. 1 is a fragmentary front elevational view, with parts broken away and sectioned, of a shuttle embroidery machine demonstrating features of the present invention.

Referring now specifically to the drawings, brief reference will be made to the details of a typical automatic shuttle embroidery machine of the type generally known in the prior art to facilitate an understanding of the environment for the present improvements. The shuttle embroidery machine, generally designated by the reference numeral 10, may be of the type shown in U.S. Patent No. 2,030,495 of Feb. 11, 1936, to Max Bretschneider, and includes an embroidery frame 12 having a series of longitudinally extending girts 14 for mounting the components of the machine. A gatter frame which carries upper and lower cloth wagons is mounted on the support 12 for adjustment both horizontally and vertically, as is generally understood to displace the cloth C in a complex path in accordance with the concurrent vertical and horizontal shift of such gatter frame. In the interest of simplicity, only the lower half of the machine 10 will be described and the showing of the lower wagon and the supporting gatter frame have been deleted, it sufficing to show the cloth C in position for the stitching and boring operations in accordance with the present invention. The complex movement of the material or cloth C is determined by an automat of the Jacquard type, as is generally understood.

The cloth C passes vertically in front of a shuttle box rail 16 extending longitudinally of the machine which remains relatively fixed in position except when the rail 16 is moved rearwardly to facilitate the threading of the cloth C into the machine. The rail 16 carries a series of spaced shuttle boxes 18 corresponding to each of the needles. The shuttle boxes 18 contain shuttles having bobbins therein which provide the supply of shuttle threads for the respective needles, with the shuttle boxes 18 being reciprocated at an angle of approximately 15° to the vertical as required during the machine cycle, by a reciprocating shuttle driver rail 20 carrying top and bottom shuttle drivers 22, 24 which engage and reciprocate the respective shuttles. For a detailed showing of a typical, but merely illustrative shuttle drive, reference may be made to copending application Serial No. 765,407 filed on October 6, 1958, now abandoned, and entitled Shuttle Drive which application is assigned to the assignee of the present invention. Each of the shuttle boxes 18 carries a plate 26 which lies behind the cloth C and is formed with a needle hole and a spaced bore point hole which receive a needle 28 and bore point 30 respectively.

The needles 28 are mounted for reciprocating movement through stitch-forming strokes along a path at right angles to the cloth C. Specifically the needles 28 are carried on a needle rail 32 extending longitudinally of the machine frame 12 and mounted for reciprocating movement by a series of rail mounting shafts 34 which are received in transversely extending bores formed in a main casting 36. The rail mounting shafts 34 are fixed at their inner ends to mounting brackets 38 which in turn are secured to the needle rail 32 at spaced locations therealong, with the mounting shafts 34 in their respective guiding bores in the casting 36 guiding the needle rail 32 for the requisite transverse reciprocating movement. In a similar fashion, the boring points 30 are secured to a boring point rail 40 mounted for transverse reciprocation by rail mounting shafts 42 disposed in spaced parallel relation to the rail mounting shafts 34 and accommodated within appropriate guiding bores formed in the casting 36. The inner ends of the respective rail mounting shafts 42 are fixed to brackets 44 secured to the bore point rail 40 at spaced locations therealong. Thus, both the needles 28 and the boring points 30 are mounted for transverse reciprocation by their respective mounting shafts 34, 42 on the casting 36 which, in part, comprise respective means for mounting these stitching tools on the machine support 12.

The needle thread, generally designated by the letter T, is threaded along a sinuous path including first and second thread tension carriers 46, 48, known generally as the short stroke tension carrier and the long stroke tension carrier respectively. The thread T first passes about the short stroke tension carrier 46 which carrier includes a mounting shaft 50 extending longitudinally of the main casting 36 and journalled therein. The mounting shaft 50 carries a series of upstanding mounting arms 52 which carry at their outer ends the short stroke tensioning rod 54 which extends longitudinally of the machine. The thread T is then passed about the long stroke tension carrier 48 which similarly includes a mounting shaft 56 journalled longitudinally of the casting 36 and carrying a series of upstanding mounting arms 58 having mounted thereon a longitudinally extending long stroke tensioning rod 60. As is generally understood, the respective thread tension carriers 46, 48 are mounted by the described means on the support 12 for movement through their respective operating cycles and are moved in relation to each other during the embroidery cycle to initially produce loop in the threads T and thereafter to allow the needles to carry the threads into the cloth C; and after the shuttles are looped through the threads, to draw back the threads to complete the stitch. Since the coaction and timing of the shuttles, needles, boring points and tension carriers are generally understood, and are subject to a latitude of variation and change, further description will be dispensed with in the interest of brevity. Further, and although the mechanism now and hereafter to be described are shown at only one location along the length of the embroidery machine 10, it will be appreciated that substantially identical mechanisms may be provided at further locations along the length of the machine, including the upper and lower sections thereof.

Figure 2:
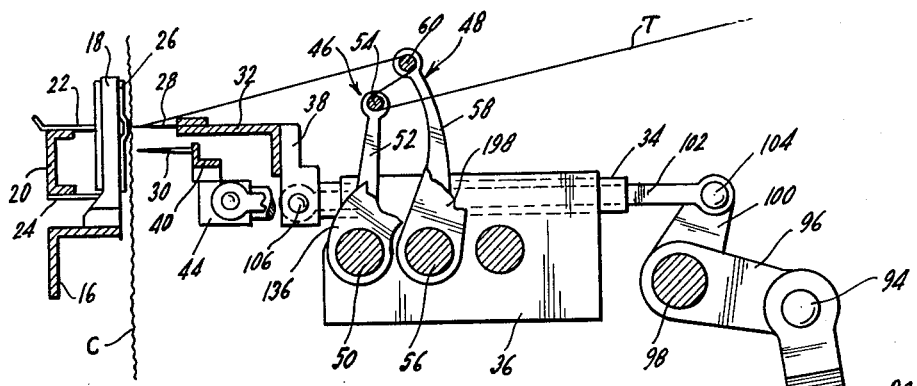
FIG. 2 is a side sectional view taken substantially along the line 2—2 of FIG. 1 looking in the direction of the arrows and showing the detail of the actuating and controlling mechanism for moving the needles through the stitch-forming cycle.
Figure 3:
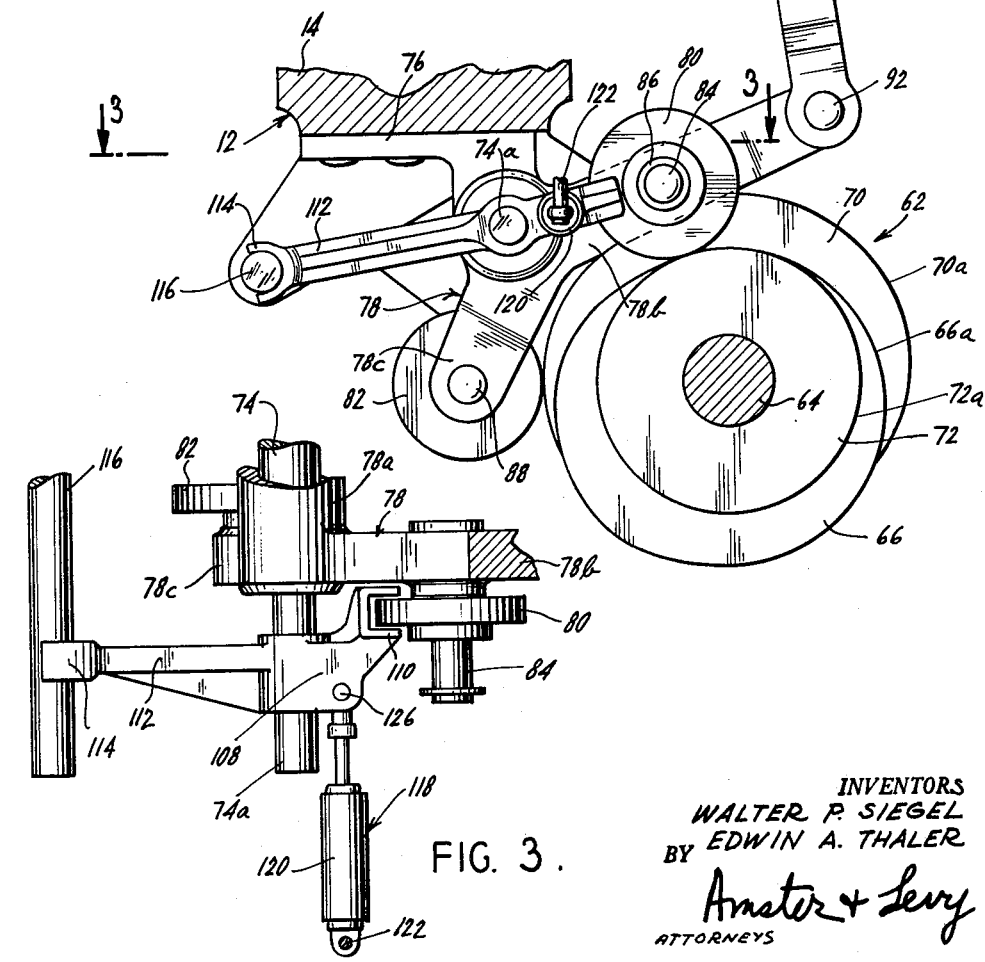
FIG. 3 is a fragmentary plan view taken substantially along the line 3—3 of FIG. 2 showing the details of the electrically responsive pneumatic follower shifting means which is operatively connected to the cam follower of the actuating and control mechanisms for the needles.

Reference will now be made to FIGS. 1 to 3 inclusive for description of the actuating and controlling mechanisms for reciprocating the needle rail 32, generally designated by the reference numeral 62, which are operated from a main cam or actuating shaft 64 of the machine which extends between the end frames of the machine support 12 and is journalled on appropriate bearings. An appropriate variable speed drive, which will be described generally in connection with the control circuit, is fixed to the main cam or actuating shaft 64 for rotating the same at the prescribed speed during the embroidery cycle. Fixed to the actuating shaft 64 at the location of the needle controlling and actuating mechanism 62 is an actuating cam 66 having cam surfaces 66a including rise and dwell portions appropriate to reciprocate the needle rail 32 through the required operational cycle. The actuating cam 66 is fixed to a hub 68 keyed to the actuating shaft 64 and which also carries a countercam 70 having camming surfaces 70a complementary to the development of the camming surfaces 66a of the actuated or working cam 66. Fixed to the side of the actuating cam 66 remote from the countercam 70 is an idler or auxiliary cam 72 which has a circular camming surface 72a coinciding with and immediately adjacent to the dwell portion of the camming surface 66a of the actuating or working cam 66.

Spaced rearwardly of and above the main or actuating shaft 64 is a fixed pivot shaft 74 which is mounted on the girt 14 of the machine support 12 by appropriate mounting brackets 76 and serves as a pivotal mount for a number of the cam follower arms and levers in the machines. Specifically, there is journalled on the fixed pivot shaft 74, a double-arm cam follower lever 78 which includes a hub 78a journalled on the pivot shaft 74, a first integral arm 78b extending contiguous to the actuating or working cam 66 and having journalled thereon the working cam follower 80, and a second integral arm 78c disposed in a plane parallel to and offset from the arm 78b and extending contiguous to and rearwardly of the countercam 70 and having journalled thereon a countercam follower 82. Specifically, the working cam follower 80 is journalled on the arm 78b for side to side displacement between limit positions respectively over the working cam 66 and over the idler cam 72 by the provision of a roller stub shaft 84 which is fixed to the arm 78b and extends at right angles thereto in the direction of the idler cam 72. The stub shaft 84 is provided with a stop collar 86. The arm 78b establishes one limit position for the cam follower roller 80 over and in contact with the camming surface 66a of the working cam 66, while the stop collar 86 on the stub shaft 84 establishes another limit position for the cam follower roller 80 over and in contact with the camming surface 72a of the idler cam 72. The countercam follower roller 82 is simply journalled on the arm 78c of the cam follower lever 78 by a pin or pivot 83.

The cam follower lever 78 is coupled to the needle rail 32 for reciprocating the same in accordance with the complementary developments of the working cam and countercam 66, 70 respectively by a linkage which includes a connecting link 90 which is forked at its opposite ends and has a pivotal connection 92 at its lower end to the outer end of the arm 78b of the lever 78. The other forked end of the connecting link 90 has a pivotal connection 94 to a connecting arm 96 which is fixed to a needle shaft 98 journalled longitudinally of the machine on the support or frame thereof. At a location spaced along the needle shaft 98 from the connecting arm 96, as seen best in FIG. 1, the needle shaft 98 carries a driver arm 100 which is coupled to the mounting bracket 38 for the needle rail 32 by a needle driver link 102 which has a pivotal connection 104 at one of its ends to the driver arm 100 and a pivotal connection 106 at the other of its ends to the mounting bracket 38. Thus in response to the rotation of the main cam or actuating shaft 64, the needle rail 32 is reciprocated as a function of the development of the working cam 66 engaged by the cam follower 80 which is carried on the arm 78b and coupled via connecting link 90, connecting arm 96, needle shaft 98, driver arm 100, needle driver link 102 and mounting bracket 38 to the needle rail 32.

Provision is made for shifting the cam follower roller 80 from engagement with the working cam 66 into engagement with idler cam 72 at the time in the control cycle when the follower roller 80 is engaging the dwell portion of the working cam 66, which dwell portion has a substantial peripheral segment coinciding with the camming surface 72a of the idler cam 72. Due to the complementary development of the actuating cam 66 and the counter cam 70, no provision need be made for shifting the cam follower 82 from the peripheral camming surface 70a of the counter cam 70 since the follower roller 82 will be at a clearance position on the rise portion of the counter cam 70 when the follower roller 80 is on the dwell portion of the camming surface 66a of the working cam 66. Shifting of the cam follower 80 onto the idler or auxiliary cam 70 precludes motion transfer to the needle controlling and actuating mechanism 62 despite the continued rotation of the actuating shaft 64 such that the other coordinated functions of the embroidery machine may be achieved and established by the automat. The mechanisms which periodically laterally shift the follower roller 80 between its limit positions are under control of the automat which in turn responds to a punched paper control tape or punching P. The lateral shifting mechanisms, see FIG. 3, include a shifting member 108 which is provided with a forked head 110 embracing a rearward portion of the follower roller 80. The shifting member 108 is supported for side to side shifting movement on a turned down end section 74a of the fixed pivot shaft 74 and is guided by a rearwardly directed arm 112 carrying an integral guide yoke 114 engaging a fixed guide shaft 116 secured to the adjacent girt 114 of the machine support 12. The shifting member 108 is laterally shifted under control of an electrically responsive, pneumatically operated means which includes a double-acting piston and cylinder 118 controlled by a solenoid controlled valve and a remote electrical sensing element, as will hereinafter be described. The cylinder 120 of the pneumatic control 118 is mounted on the frame or support 12 by an upstanding stud 122, while the piston rod 124 has a pivotal connection 126 to the shifting member 108. In the position illustrated in FIG. 3, air has been admitted to one side of the piston head of the pneumatic control 118 and the piston rod 124 is extended to position the follower roller 80 in engagement with the working cam 66. In response to the introduction of air to the opposite side of the piston head, the pneumatic control 118 will shift the follower roller 80 into engagement with the idler cam 72. The use of a pneumatic control for the needle drive engagement and disengagement, and for similar functions in the embroidery machine, is particularly advantageous in that such pneumatic control is capable of reliable operation despite the repeated use thereof which, in a relatively short period of time, involves millions of operations. Further, the pneumatic control introduces a certain amount of resiliency into the system. For example, if the follower roller 80 were on the idler cam 72 and an attempt were made to shift the same onto the working cam 66 at a time other than when the camming surfaces 72a, 66a coincided, the pneumatic control would merely urge the roller 80 against the adjacent face of the working cam 66 until such time as the obstruction were removed, whereupon the shifting of the roller would be completed. Still further the pneumatic control is relatively quiet and does not generate heat incident to its operation. Still further, the pneumatic control may be placed at the location where the control function is required, its solenoid controlled valve may likewise be conveniently located, and the electrical control or sensing element may be disposed at a remote location. A typical control arrangement for the piston and cylinder 118 will be described subsequently in connection with the description of the control circuit.

Figure 4:
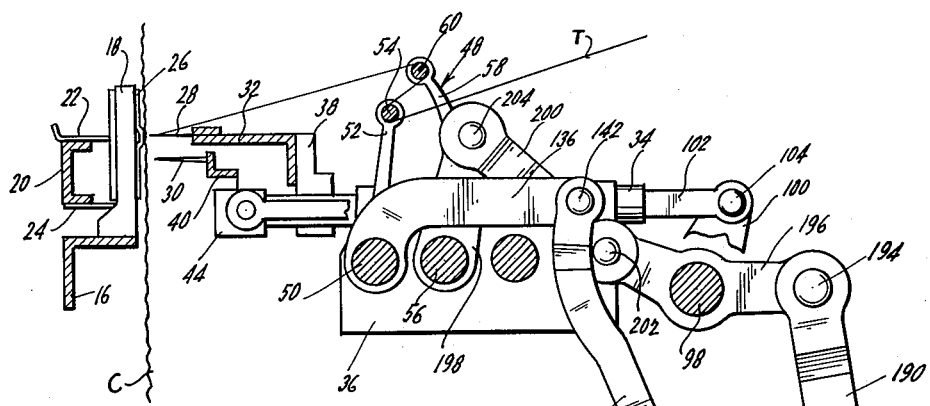
FIG. 4 is a side elevational view taken along the line 4—4 of FIG. 1 showing the actuating and control mechanisms for moving the short stroke thread carrier and the long stroke thread carrier through the respective tensioning cycles.
Figure 5:
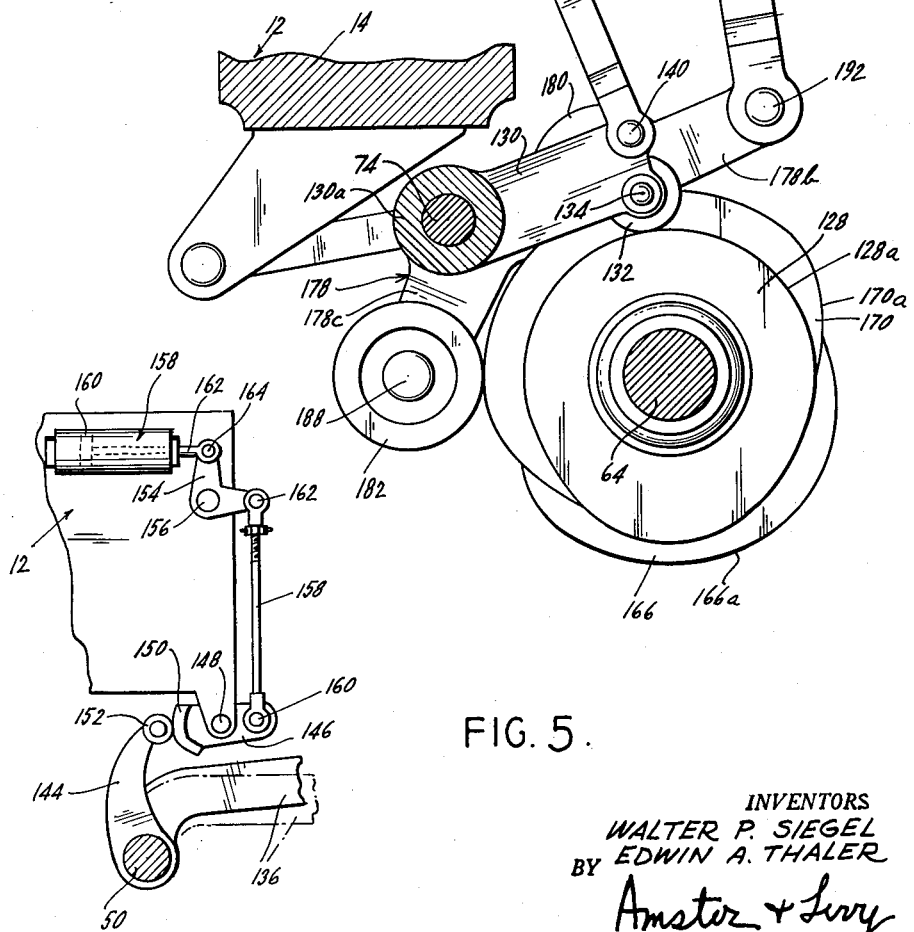
FIG. 5 is a fragmentary side elevational view showing the details of the actuating and control mechanisms for the short stroke thread carrier.

Reference will now be made to FIGS. 1, 4 and 5 for descriptions of the actuating and controlling mechanisms for the short stroke tension carrier 46 and the long stroke tension carrier 48 which are seen in FIG. 4 to lie substantially one behind the other, when looking down the length of the machine 10. The actuating and controlling mechanisms for the tension carrier 46 include a single working or actuating cam 128 affixed to the camming or actuating shaft 64 and having a camming surface 128a with an appropriate development for the short stroke tension function, as is generally understood. Mounted on the fixed pivot shaft 74 is a follower arm 130 which carries a short stroke cam follower roller 132 journalled thereon at roller pivot 134. The arm 130 is journalled on the pivot shaft 74 by means of an integral hub 130a. The cam follower arm 130 is connected to a driver arm 136 fixed to the mounting shaft 50 for the short stroke tension carrier 46 by a connecting link 138 which is forked at its opposite ends and has a pivotal connection 140 at its lower end to the arm 130 and a pivotal connection 142 at its upper end to the driver arm 136. Accordingly, the thread tension rod 54 is moved through an operating cycle in accordance with the development of the working or actuating cam 128.

Provision is made for initially adjusting the position of the follower roller 132 in relation to the working cam 128 such that the roller may be adjusted to only engage a selected segment of the rise portion of the cam 128 during operation; and to automatically shift the cam follower roller 132 out of such adjusted position under control of the automat as required during the operating cycle. Specifically, and as seen best in FIG. 5, the mounting shaft 50 for the short stroke tension carrier 46 has fixed thereto a positioning arm 144 which may be swung in the counter-clockwise direction, as viewed in FIG. 5, to swing the driver arm 136 in the same direction and to lift the cam follower roller 132 partially or completely out of contact with the camming surface 128a of the working cam 128. Specifically, a rocker lever 146 is pivotally mounted at 148 on the machine frame or support 12, and is provided with a positioning cam 150 on one arm thereof which is engaged by a cam follower roller 152 journalled on the positioning arm 144. The other arm of the rocker lever 146 is connected to a double-arm driving lever 154 having a pivotal mount 156 on the machine frame or support 12 by an adjustable length coupling rod 158 which has a pivotal connection 160 at its lower end to the rocker arm 146 and a pivotal connection 162 at its upper end to one arm of the double-arm driving lever 154. The other arm of the double-arm lever 154 is connected to a pneumatic control 158 which includes a double-acting piston and cylinder. Specifically the cylinder 160 is appropriately mounted on the machine frame, while the piston rod 162 thereof has a pivotal connection 164 to the adjacent arm of the double-arm lever 154. It will be appreciated that the follower roller 152 engages the positioning cam 150 by the weight of the system acting thereon; and that by initially rocking the rocker lever 146 about its pivotal mount 148 and making the corresponding adjustment in the length of the coupling rod 158, various initial positions may be established for the driver arm 136 and the cam follower roller 132. When any desired adjusted position is established, the actuation of the pneumatic control 158, as will be subsequently described in connection with the control circuit, is effective to lift the cam follower roller out of the adjusted position and to subsequently restore the same to the adjusted position in accordance with the operating cycle of the embroidery machine.

Reference will now be made to FIGS. 1 and 4 for a description of the actuating and controlling mechanisms for the long stroke tension carrier 48 which moves the thread tension rod 60 through the required operating cycle. The actuating and control mechanisms for the tension carrier 48 is similar to the constrained cam control for the needle drive and comprises an actuating cam 166 including camming surfaces 166a having rise and dwell portions appropriate to reciprocate the tension carrier 48 through its required operational cycle. The actuating cam 166 is fixed to a hub 168 which also carries a counter cam 170 having camming surfaces 170a which are complementary to the development of the camming surfaces 166a of the actuating or working cam 166. Fixed to the side of the actuating cam 166 remote from the counter cam 170 is an idler or auxiliary cam 172 which has circular camming surfaces 172a coinciding with and immediately adjacent the dwell portion of the camming surfaces 166a of the actuating cam 166. A double-arm cam follower lever 178 is journalled on the fixed pivot shaft 74 by a hub 178a and includes a first integral arm 178b extending contiguous to the actuating cam 166 and having journalled thereon the actuating cam follower 180 and a second integral arm 178a which is disposed in a plane parallel to and offset from the arm 178b and extending contiguous to and rearwardly of the counter cam 170 and having journalled thereon a counter cam follower 182 (see FIG. 4).

The actuating cam follower 180 is journalled on the arm 178b for side to side displacement between limit positions respectively over the working cam 166 and over the idler cam 172 by a roller stub shaft 184 formed with an integral stop collar 186. The arm 178b establishes one limit position for the cam follower roller 180 in contact with the working cam 166, while the stop collar 186 establishes another limit position for the cam follower roller in contact with the idler cam 172. The counter cam follower roller 182 is simply journalled on the arm 178c of the cam follower lever 178 by a pin or pivot 188.

The cam follower lever 178 is coupled to the mounting shaft 56 of the long stroke tension carrier 48 for rocking the same in accordance with the complementary developments of the working cam 166 and the counter cam 170 by a linkage which includes a connecting link 190 forked at its opposite ends. The lower forked end of the connecting link 190 has a pivotal connection 192 to the outer end of the arm 178b of the double-arm lever 178, while the upper forked end of the connecting link 190 has a pivotal connection 194 to a double-arm coupling lever 196 pivoted on the needle shaft 98. The double-arm coupling lever 196 is connected to a driver arm 198 fixed to the mounting shaft 66 by a connecting link 200 which is forked at its opposite ends and has a pivotal connection 202 at its lower end to the double-arm coupling lever 196 and a pivotal connection 204 at its upper end to the driver arm 198 on the mounting shaft 56. Thus, in response to rotation of the cam or actuating shaft 64, the long stroke tension carrier 48 is moved as a function of the development of the actuating cam 166 engaged by the cam follower 180 which is carried on the arm 178b and coupled via connecting link 190, coupling lever 196, connecting link 200 and driver arm 198 to the mounting shaft 56 of the tension carrier 48.

Provision is made for shifting the cam follower roller 180 from engagement with the working cam 166 into engagement with idler cam 172 at the time in the control cycle when the cam follower roller 180 is engaging the dwell portion of the working cam 166 to preclude motion transfer to the long stroke tension carrier 48, despite the continued rotation of the actuating shaft 64 under control of the automat. The mechanisms which periodically laterally shift the follower roller 180 between its limit positions under control of the automat include a shifting member (similar to the shifting member 108) which embraces a portion of the follower roller 180 and is supported for side to side shifting movement on the turned down end section 74b of the fixed pivot shaft 74. The shifting member, which is mounted in a manner identical to that shown in detail in FIG. 3 but in back to back relation thereto, is laterally displaced by an electrically responsive pneumatic control which includes a double-acting piston and cylinder 208 selectively activated by a solenoid controlled valve and a remote electric sensing element, as will be described hereinafter in connection with FIGS. 17A and 17B. Since the pneumatic control for shifting the cam follower roller 180 is identical to the pneumatic control 118 previously described in connection with the needle drive, except for the timing of its operation, further description thereof will be dispensed with in the interest of brevity.

Provision is made for manually shifting the shuttle box rail 16 at right angles to and away from the plane of the cloth C (see FIG. 2) to facilitate the loading of the cloth C into the machine. As seen in FIGS. 6 and 7, the shuttle box rail 16 is mounted for such rearward shifting on a number of mounting shafts 210 which are fixed by appropriate flanged brackets 212 to the shuttle box rail 16 and are guided in appropriate bearings 214a, 214b in a composite bearing member 214 fixed to the rear or back girt 15 of the machine frame 12. Intermediate the bearings 214a, 214b of the composite bearing member 214, the mounting shaft 210 has secured thereto an actuating collar 216 which is coupled to and actuated from a rail-retracting shaft 218 journalled on the machine frame, as by the bearings 214c of the composite bearing member 214. Specifically, the rail-retracting shaft 218 has secured thereto a driving arm 220 which is coupled to the actuating collar 216 by a connecting link 222 which has a pivotal connection 224 at one end to the collar 216 and a pivotal connection 226 at its other end to the driving arm 220. It will be appreciated that the shuttle box rail 16 is normally in the position illustrated and is only retracted when the cloth C is to be loaded. Accordingly, the retracting mechanisms can be disregarded so far as the shuttle drive is concerned, except that the shuttle drive must be compatible with the arrangement enabling rearward shifting of the shuttle box rail.

Reference will now be made to FIGS. 6 and 7 for a description of the actuating and controlling mechanisms for the shuttle driver rail which is to be reciprocated at an angle of approximately 15° to the vertical for actuating the respective shuttles mounted in the boxes 18 on the relatively fixed shuttle box rail 16. The shuttle drive rail 20 is mounted on the relatively fixed shuttle box rail 16 through the provision of a number of driver rail mounting shafts 228 which are received within bearings 230 fixed to the rail 16. The upper ends of the respective mounting shafts 228 are fixed to the shuttle drive rail 20 by a casting 232 which is secured to the rail 20. The shuttle drive rail 20 is moved by a reciprocating drive rod 234 which extends lengthwise of the machine and is actuated from the main cam shaft 64, as will be detailed specifically in connection with FIGS. 8 to 11 inclusive. The reciprocating drive rod 234 for the shuttle drive rail 20 is coupled thereto by a bell crank lever 236. The arm 236a of the bell crank lever 236 is connected to the drive rod 234 by an appropriate coupling including a pivot 238, while the arm 236b, which is bifurcated as seen in FIG. 7, carries a mounting pin 240. The bell crank lever 236 is fixed to a mounting shaft 242 which is journalled in bearings 214d, 214e of the composite bearing casting 214 to rockably mount the lever 236. Slidably mounted on the pin 240 of the arm 236b of the double-arm lever 236, is a laterally shiftable coupling fork 244 which permits the necessary movement of the shuttle box rail 16 and the shuttle drive rail 20 in relation to the support. At such times when the relatively fixed shuttle box rail 16 is retracted, it will be appreciated that the shuttle drive rail 20 is likewise retracted and there is relative movement of the coupling fork 244 along the pin 240 on the double-arm lever 236. The coupling fork 244 has a pivotal connection 246 to an ear 232a integral with the casting. Accordingly, in response to counterclockwise turning movement of the arm 236b of the lever 236 about the pivotal mount 242 the shuttle drive rail 20 will be driven through its upward stroke; and in response to clockwise turning movement of the arm 236b, the shuttle drive rail 220 will be reciprocated through its return stroke.

In order to preclude binding of the coupling fork 244 on the mounting pin 240 there is fixed to the lower end of the mounting shaft 228 of the shuttle driver rail 20 a laterally extending arm 248 which has a forked end engaging a depending extension 250 on the coupling fork 244. This precludes any tendency for the coupling fork 244 to bind as it is shifted along the pin 240.

In order to counterbalance some of the dead weight of the shuttle drive rail 20, a biasing spring 252, which is appropriately anchored on the support and connected by collar 254 to the reciprocating drive rod, is arranged to bias such rod to the right in FIGS. 6 and 7 and against the dead weight of the system.

Reference will now be made specifically to FIGS. 8 to 11 inclusive for a description of the mechanisms for reciprocating the drive rod 234 (see FIGS. 6 and 7) which in turn actuates the shuttle drive rail 20. Specifically, the main cam or actuating shaft 64 has secured thereto a pair of spaced actuating or working cams 256, 258 each having a development appropriate to achieve the required reciprocation of the shuttle drive rail 20. Disposed inwardly of the respective actuating or working cams 256, 258, are counter cams 260, 262 which have cam developments complementary to the developments of the working cams 256, 258. The cams 256, 258 are engaged by respective cam follower rollers 264, 266, while the counter cams 260, 262 are engaged by respective counter cam followers 268, 270 (see FIG. 11). The cam follower rollers 264, 266, 268 and 270 are mounted on a common casting 272 by means of respective stub shafts 274, 276. The casting 272 is suspended for vertical reciprocation under control of the double constrained cam control on upstanding guide rods or ways 278, 280 which are fixed to the machine frame or support 12. The casting 272 is resiliently hung for reciprocation vertically along the paths determined by the guide rods or ways 278, 280 by springs 282, 284 which are anchored at their upper ends to the support 12 (see FIG. 11) and are secured at their lower end to their casting 272 by pins 286, 288.

Extending beneath the main cam shaft 64 is a transverse rocker shaft 290 which is journalled on the machine frame by appropriate bearings 292, 294. The rocker shaft 290 carries a forked rocker arm 296 (see FIG. 11) which is coupled to the casting 272 by a connecting link 298 having a pivotal connection 300 at its upper end of the casting and a pivotal connection 302 at its lower end to the adjacent end of the forked rocker arm 296. Thus in response to vertical reciprocation of the casting 272 under control of the double constrained balanced cam and follower arrangement, the rocker shaft 290 is rocked on its axis through a predetermined arcuate traverse, as will now be described, and is effective to reciprocate the drive rod 234.

Figure 8:
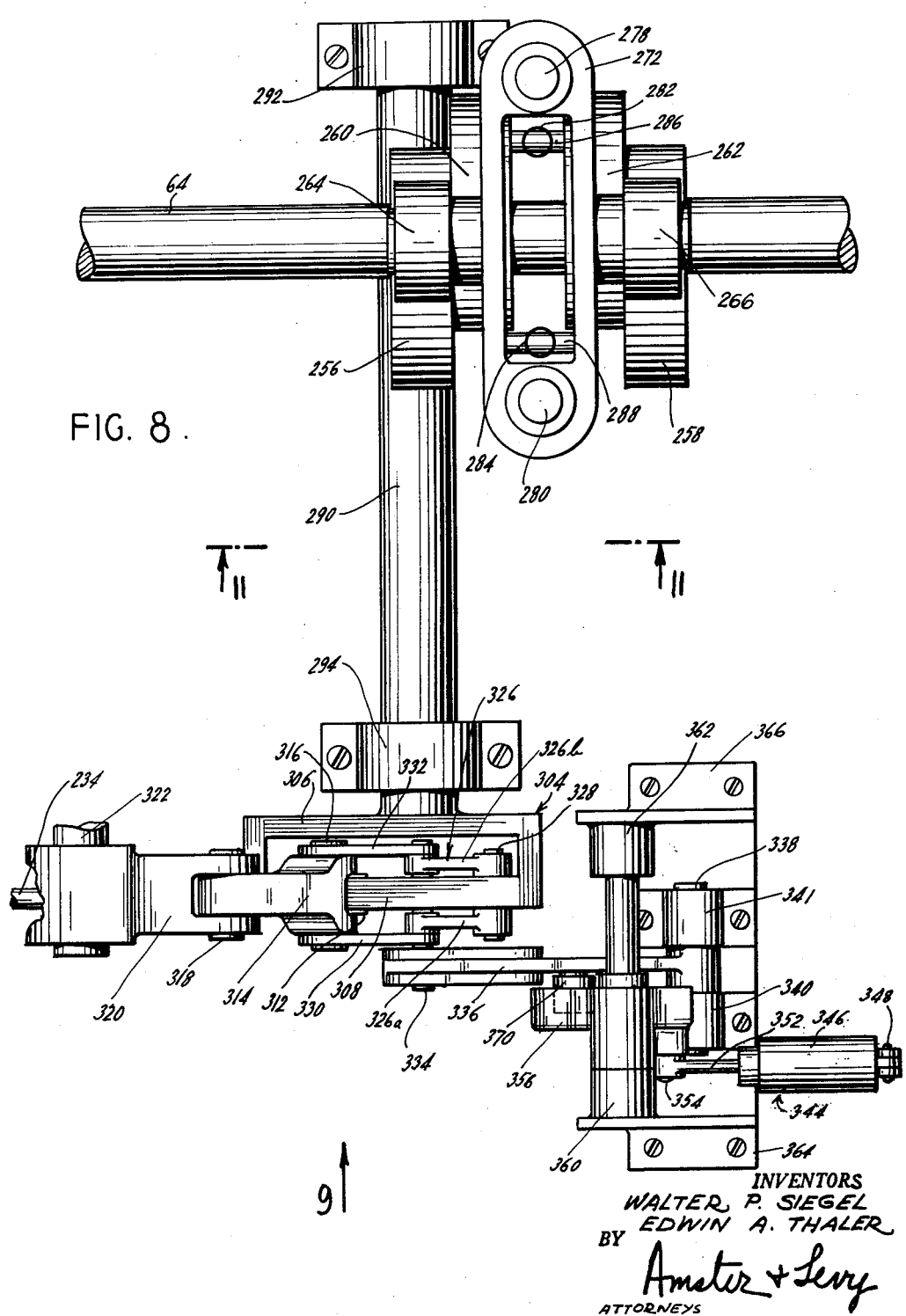
FIG. 8 is a plan view of a part of the embroidery machine taken to the right of the part shown in plan in FIG. 7 and showing further details of the actuating and controlling mechanisms for the shuttle.
Figure 11:
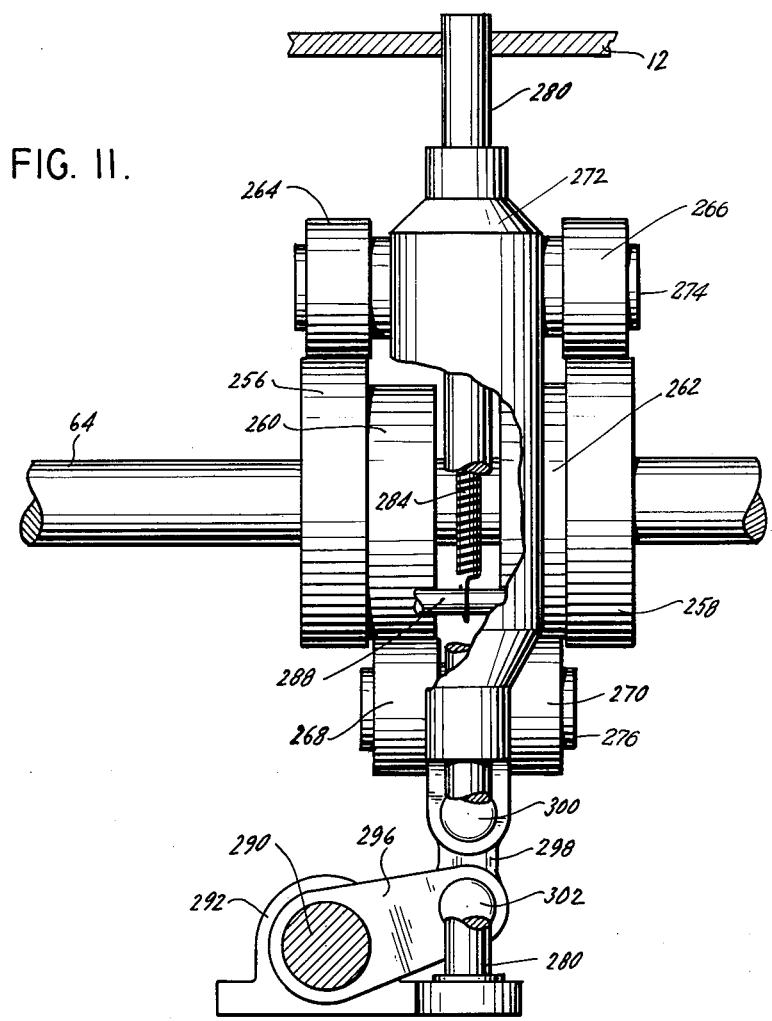
FIG. 11 is a fragmentary elevational view taken substantially along the lines 11—11 of FIG. 8 and looking in the direction of the arrows.

Specifically, the transfer rocker shaft 290 has fixed at its rearward end a rocker head 304 which includes a rear wall 306 fixed to the adjacent end of the shaft and a front wall 308 formed with a slideway 310 which receives a slide block 312 which may be adjusted along the slideway 310 as will be described. The block 312 is normally disposed in the operative position shown in FIG. 9 for reciprocation of the shuttle drive rail 20 and is coupled to the shuttle drive rod 234 by a connecting link 314 which has a pivotal connection 316 at its lower end to the slide block 312 and a pivotal connection 318 at its upper end to one arm of a bell crank 320. The bell crank 320 is mounted on a fixed pivot 322 on the machine frame and has its other arm coupled to the drive rod 234 at pivotal connection 324. Thus, in response to rocking motion of the head 304 between the full and dotted line position shown in FIG. 9, reciprocating motion is imparted to the connecting link 314 which is coupled via the bell crank 320 to the shuttle drive rod 234 for actuating the shuttle drive rail 20. In this connection it will be appreciated that the slide block 312 is radially spaced from the longitudinal center axis of the rocker shaft 290; and as the slide block 312 is brought into an inoperative position along the center line of the rocker shaft 290, less and less reciprocating motion is imparted to the drive rod 234 and to the drive rail 220. The slide block 312 is brought to a position coinciding with the longitudinal center axis of the rocker shaft 290 automatically during machine operation to disable the shuttle drive, such disabled position being shown in FIG. 10. Specifically, a guiding link 326 is pivotally mounted on the front wall 308 of the front head 304 at a relatively fixed pivotal mount 328. As seen in FIG. 8, the guiding link 326 actually includes two link sections 326a, 326b in spaced side by side relation arranged symmetrically of the front wall 308 of the head 304. The link sections 326a, 326b are connected by a pair of straps or links 330, 332 to the slide block 312. The straps 330, 332 extend outwardly of the arms 326a and 326b and are connected thereto by a pin 334. The other ends of the straps are connected to the slide block 312 by a pin 316. The pin 334 in the operative position for the shuttle drive coincides with the longitudinal center line of the rocker shaft 290, with the effective rocker arm for the shuttle drive being determined by the spacing between the pins 334, 316. As seen in FIG. 10, the slide block 312 may be displaced to an inoperative position wherein the pin 316 occupies the position formerly occupied by the pin 334, with the guiding link 326 and the straps 330, 332 moving into an acuate angular relationship to disable the rocker and the shuttle drive.

Provision is made for automatically shifting the slide block 312 in relation to the rocker head 304 to disable the shuttle drive under control of the automat of the machine. Specifically, and as seen best in FIGS. 8 and 9 a drive engaging and disengaging arm 336 is provided which has a pivotal mount 338 in bearings 340, 341 fixed to the machine frame. The arm 336 is formed with a lost motion slot 342 at its forward end which slot guidingly engages the pin 334 of the linkage 326, 330, 332. In response to clockwise turning of the arm 336 about its pivotal mount 338, the pin 334 will be displaced upwardly to the slide block 312 from its operative position shown in FIG. 9 to its inoperative position shown in FIG. 10. During such shifting movement, the pin 334 remains at one extremity of the lost motion slot 342. The lost motion slot 342 has a curvature on a radius about the pin 316 such that when the shuttle drive is disabled, the pin 334 can translate along the lost motion slot 342 incident to the continued rocking movement of the rocker shaft 290. Effectively the motion that is transmitted to the connecting link 314 during operation of the shuttle drive is compensated for by the lost motion travel of the pin 334 in the lost motion slot 342. The engaging and disengaging arm 336 is periodically rocked about its pivotal mount 338 through a cam and follower from a pneumatic control 344 including a cylinder 346 having a pivotal mount 348 on a bracket 350 fixed to the machine frame and a piston rod 352 having a pivotal connection 354 to a rocking cam member 356. The rocking cam member 356 is mounted adjacent its upper end on a mounting shaft 358 which is journalled in bearings 360, 362 fixed to upstanding mounting brackets 364, 366 (see FIG. 8). The rocking cam member 356 is formed with a cam track 368 which engages a follower roller 370 pivoted on the engaging and disengaging arm 336. The development of the cam follower track 268 is such as to gradually apply the constant force of pneumatic control to the engaging and disengaging arm 336 to assure smooth operation. The pneumatic control is operated by a solenoid controlled valve from a remote electrical sensing element, as will be hereinafter described. Introduction of air to the right of the cylinder in the operative position (FIG. 9) of the mechanism will cause the cam member 356 to turn in a clockwise direction about the pivotal mount 358 which in turn causes the arm 336 to rock in the clockwise direction to move the slide block 312 to the inoperative position wherein the shuttle drive is disengaged. In the disengaged position, no drive is imparted to the shuttle drive rail even though the rocker shaft 290 continues to rock under control of the double constrained cam control from the main cam shaft 64.

Referring now specifically to FIGS. 12 to 15 inclusive, there is partially shown the bore controlling and actuating mechanism 380 which is substantially identical in construction to the device shown in application Serial No. 714,254, filed February 10, 1958 (now U.S. Pat. No. 2,950,694 of August 30, 1960) in the name of Walter P. Siegel, and assigned to the assignee of the present invention, except as detailed hereinafter. As disclosed in said patent, a cam, counter cam and idler cam is mounted on the actuating shaft 64, with the cam drive being selectively disabled by the lateral shifting of an actuating cam follower roller 382 which is mounted on a stub shaft 384 for side to side shifting movement respectively into and out of engagement with the actuating cam and the idler cam. The cam follower roller 382 is laterally shifted by a shift mechanism including a double arm lever 386 which is mounted on an integral stud 388 on the machine frame 12 for rocking movement in a substantially horizontal plane about the stud 388 as a vertical axis. The arm 386a of the lever 386 carries a pair of spaced pins 390 which engage the opposite faces of the cam follower roller 382 to position the same in engagement with either the actuating cam or the idler cam. The follower roller shift lever 386 is rocked about its axle or pin 388 by a pneumatic control 392 including a cylinder 394 and a piston 396. The cylinder 394 is rockably mounted on an upstanding mounting stud 398 fixed to the machine frame 12, while the piston rod 396 is coupled to the arm 386b of the lever 386. The double acting piston and cylinder 394, 396 is selectively activated under control of the Jacquard mechanism as will subsequently be described, to enable and disable the bore actuating and control mechanisms 380 which control the boring points 30.

As detailed in said patent, provision is made for adjusting the boring stroke through a stroke-adjusting assembly which includes a bore depth control shaft 400 journalled on the machine frame 12. The bore depth control shaft carries a pair of identical and confronting face cams provided with respective spiral cam tracks of progressively increasing radius which are engaged by followers in the form of shoes of hardened steel for the stroke adjusting function.

Figure 15:
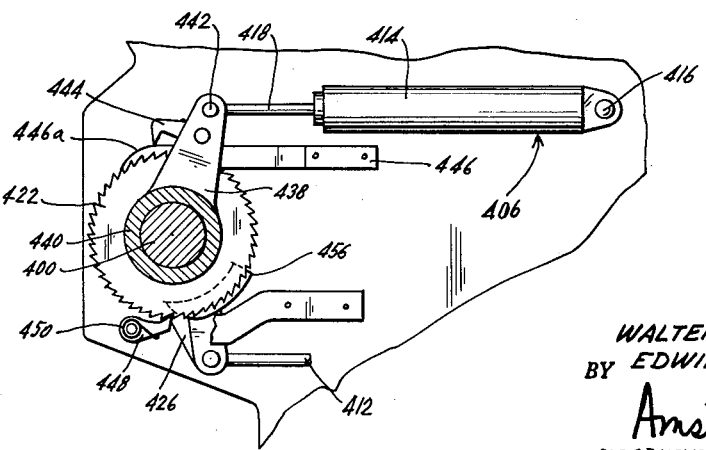
FIG. 15 is a fragmentary sectional view taken substantially along the line 15—15 of FIG. 12 and looking in the direction of the arrows.

The control shaft 400 may be adjusted manually by the provision of a turning wheel 402, or may be adjusted through respective spring returned pneumatic controls 404, 406. As seen in FIG. 13, the pneumatic control 404 includes a cylinder 408 pivotally mounted at 410 on the machine frame, and a piston rod 412 which is coupled to a stepping pawl as will be subsequently described, arranged to turn the bore depth control shaft 400 in the clockwise direction (see FIG. 13) for decreasing the length of the boring stroke. Similarly, as seen in FIG. 15, the pneumatic control 406 includes a cylinder 414 having a pivotal mount 416 on the machine frame and a piston rod 418 which is coupled to a stepping pawl for turning the control shaft 400 in the counterclockwise direction for increasing the stroke length. The respective pneumatic controls 404, 406 are coupled to the control shaft by a series of stepping and holding pawls connected to actuating ratchets 420, 422 secured to the shaft 400. The actuating ratchet 420 is engaged by a stepping pawl 424 pivotally mounted on a pawl-carrying arm 426 journalled by bearing cam 428 on the control shaft 400, which arm is coupled to and rocked in the clockwise direction by the activation of the pneumatic control 404 (see FIG. 13). The stepping pawl 424 is pivoted on the arm 426 and biased toward the actuating ratchet 420 by a spring 430. The stepping pawl 424 is normally held out of engagement with the ratchet 420 by a camming member 432 fixed to the machine frame. The camming member 432 is positioned relative to the stepping pawl 424 and is provided with a camming surface 432a which, in response to the stroke of the piston rod 412 toward the left in FIG. 13, permits the stepping pawl to move into engagement with the ratchet 420 to step the same, as shown by the dotted line position for the stepping pawl (see FIG. 13). At a location approximately 180° removed from the actuating pawl 424, the machine frame or support carries a pivoted holding pawl 434 which is biased by a spring 436 into engagement with the ratchet 420 for the usual holding function. Accordingly in response to activation of the pneumatic control 404, the ratchet 420 is stepped in a direction appropriate to decrease the boring stroke, and is held in the stepped position until the bore stroke is further decreased or increased.

It will be appreciated that the holding pawl 434 for the stroke decreasing ratchet 420 would interfere with the rotation of the control shaft 400 in the counterclockwise direction incident to adjustments for increasing the bore stroke length. Thus provision is made for moving the holding pawl 434 out of engagement with the ratchet 420 at such times when an adjustment is made for increasing the boring stroke, as will subsequently be described. As seen in FIGS. 12 and 15, a ratchet carrying arm 438 is journalled on the control shaft 400 by a bearing cam 440 and is appropriately coupled at pivotal connection 442 to the piston rod 418 of the pneumatic control 406. The arm 438 has pivotally mounted thereon the stepping pawl 444 for the bore stroke increasing ratchet 422, which stepping pawl is appropriately spring-biased in a direction appropriate for engagement with the ratchet 422. The machine frame carries a camming member 446 having camming surfaces 446a arranged to normally retain the stepped pawl 444 out of engagement with the ratchet 422. In response to activation of the pneumatic control 406, the stepping pawl 444 moves into engagement with the ratchet 422 for stepping the same in a direction appropriate to turn the control shaft 400 in the counterclockwise direction for increasing the bore stroke. Mounted on the machine frame or support at a location approximately 180° removed from the stepping pawl 444 is a holding pawl 448 which is pivotally mounted and biased by spring 450 into engagement with the ratchet 422 for the usual holding function. Here again, the holding ratchet 448 would interfere with the indexing of the control shaft in the clockwise direction incident to stroke-decreasing adjustments, and accordingly provision is made for moving the holding pawl 448 out of engagement with the ratchet 422, when stroke-decreasing adjustments are required. Specifically, the arm 426 for the stepping pawl 424 is provided with a laterally projecting mounting arm 452 (see FIG. 12) which carries a mounting plate 454 extending parallel to the arm 426 and adjacent the stroke-increasing ratchet 422. The mounting plate 454 carries a holding pawl disengaging cam 456 which is positioned in response to clockwise movement to disengage the holding pawl 448 of the stroke-increasing assembly shown in FIG. 15. Accordingly, when the arm 426 is turned in the clockwise direction (see FIG. 13) incident to the operation of the stroke-decreasing control 404, the holding pawl 448 is cammed out of engagement with the stroke-increasing ratchet 422 to free the control shaft for turning movement by the stroke-decreasing ratchet 420. In a similar fashion, the arm 438 for the stepping pawl 444 carries an offset mounting pin 458 which in turn supports a mounting plate 460 extending adjacent to the stroke-decreasing ratchet 420. The mounting plate 460 carries a camming member 462 which is arranged in response to the counterclockwise turning movement of the arm 438 to disengage the holding pawl 434 for the ratchet 420 at such times when the control shaft 400 is to be indexed by the pneumatic control 406 and the stroke-increasing ratchet 422. As seen in FIG. 14, the bore depth control shaft 400 further carries a holding ratchet 464 which is engaged by a pivoted holding pawl 466 biased by spring 468 into contact with the notches or ratchet teeth 464a. The holding ratchet 464 carries an over-ride cam 470 including camming surfaces 470a and 470b which selectively open one or more safety switches 580 to lock out adjustment of the bore depth control, as will be detailed in connection with the description of FIGS. 17A and 17B. Specifically, as the bore stroke is increased, the holding ratchet 464 turns in the counterclockwise direction, and at the maximum permissible limit for such increase the camming surface 470a of the over-ride cam 470 actuates the safety switches; and conversely, in response to the clockwise turning movement of the ratchet 464 incident to decreasing the bore stroke, the camming surface 470b will activate the safety switches when the minimum permissible limit for such adjustment is reached. As detailed in said copending application, the cam followers of the bore stroke adjustment assembly approach the end limits of the spiral tracks, and the purpose of the over-ride cam 420 and the safety switches is to preclude adjustments of the control shaft 400 which would otherwise be blocked by the end limits of the respective cam tracks.

Figure 16:
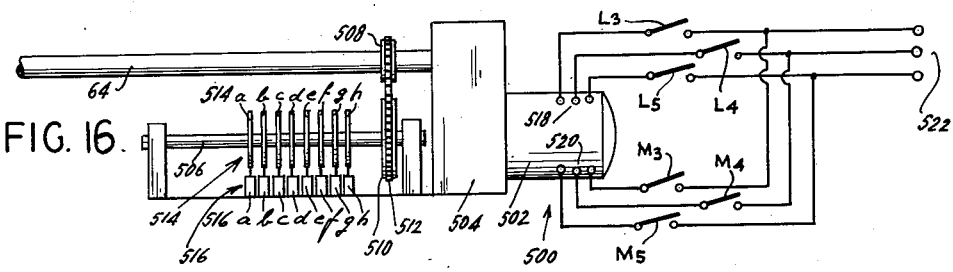
FIG. 16 is a combined diagrammatic and schematic illustration of a typical two-speed drive and timing control utilized in the present shuttle embroidery machine.

Referring now specifically to FIG. 16, there is shown an illustrative two-speed drive arrangement, generally designated by the reference numeral 500, which includes a conventional two-speed motor 502 having its output shaft coupled through a speed reduction unit 504 to the actuating or main cam shaft 64 of the machine 10. Coupled to and driven from the actuating shaft 64 is a timing shaft 506 which turns at half the speed of the actuating shaft 64. The timing shaft 506 is coupled to the actuating shaft 64 by means of a chain drive including a sprocket 508 on the shaft 64, a sprocket 510 of twice the diameter on the timing shaft 506, and a chain 512 trained over the sprockets 508, 510. The timing shaft 506 carries a bank of timing cams, generally designated by the reference numeral 514, which selectively operate a bank of timing switches, generally designated by the reference numeral 516, for purposes which will become apparent in connection with the description of the control circuit of FIGS. 17A and 17B. The two-speed motor 502 includes two sets of internal windings having energization terminals 518, 520 for establishing the fast and slow speeds respectively. The fast speed terminals 518 are connected over relay contacts $L_3$, $L_4$, $L_5$ to a three-phase source of alternating current 522, and the slow speed terminals 520 are likewise connected over relay contacts $M_3$, $M_4$, $M_5$ to the three-phase source 522.

It will be appreciated that the showing of the two-speed motor 502 is purely illustrative and that such two-speed motor may be replaced by a conventional variable speed drive which is capable of adjustment over the range of speeds.

Figure 17A:
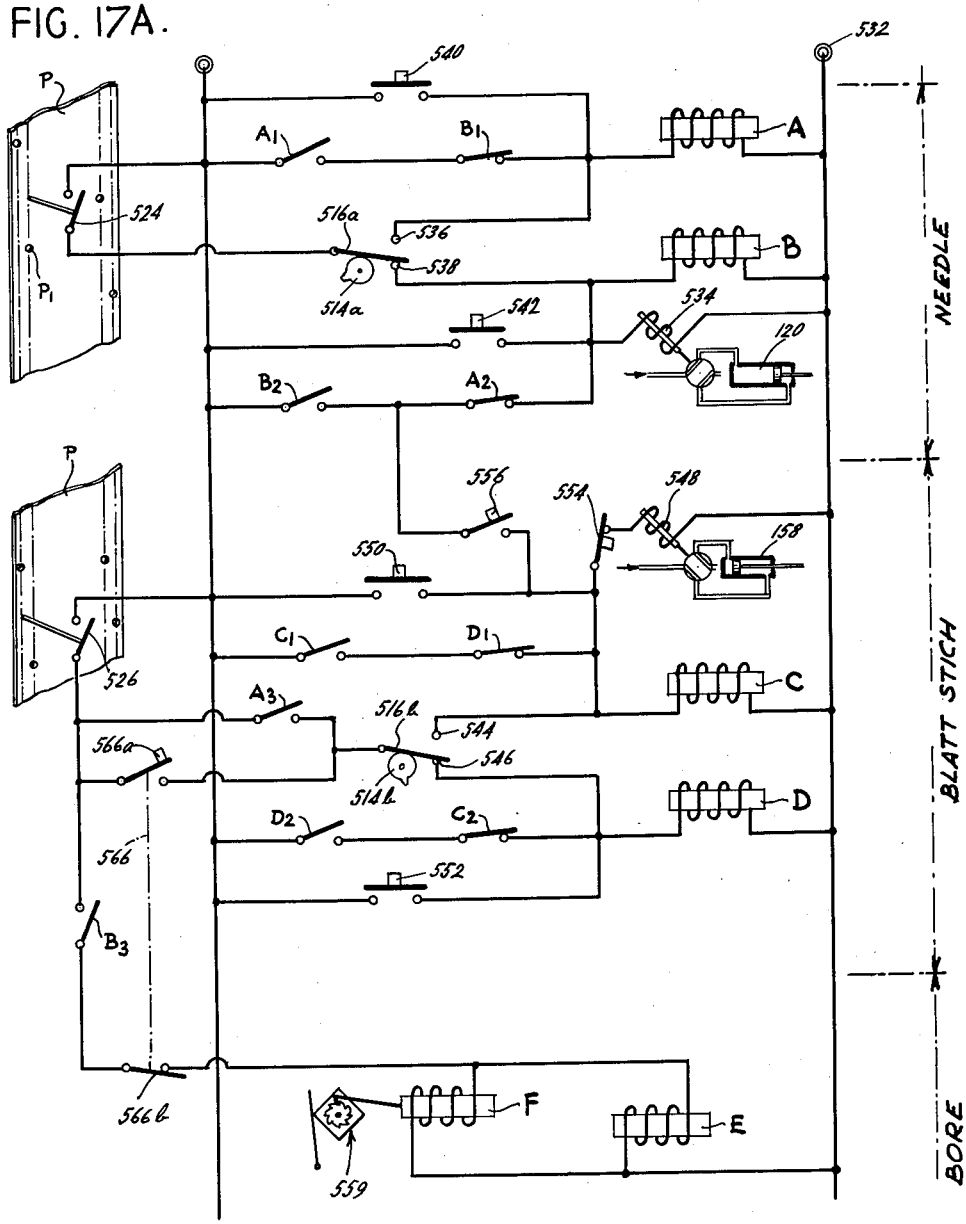
FIGS. 17A and 17B are together a ladder diagram of the control circuit for coordinating the several actuating and control functions in the present shuttle embroidery machine.
Figure 17B:
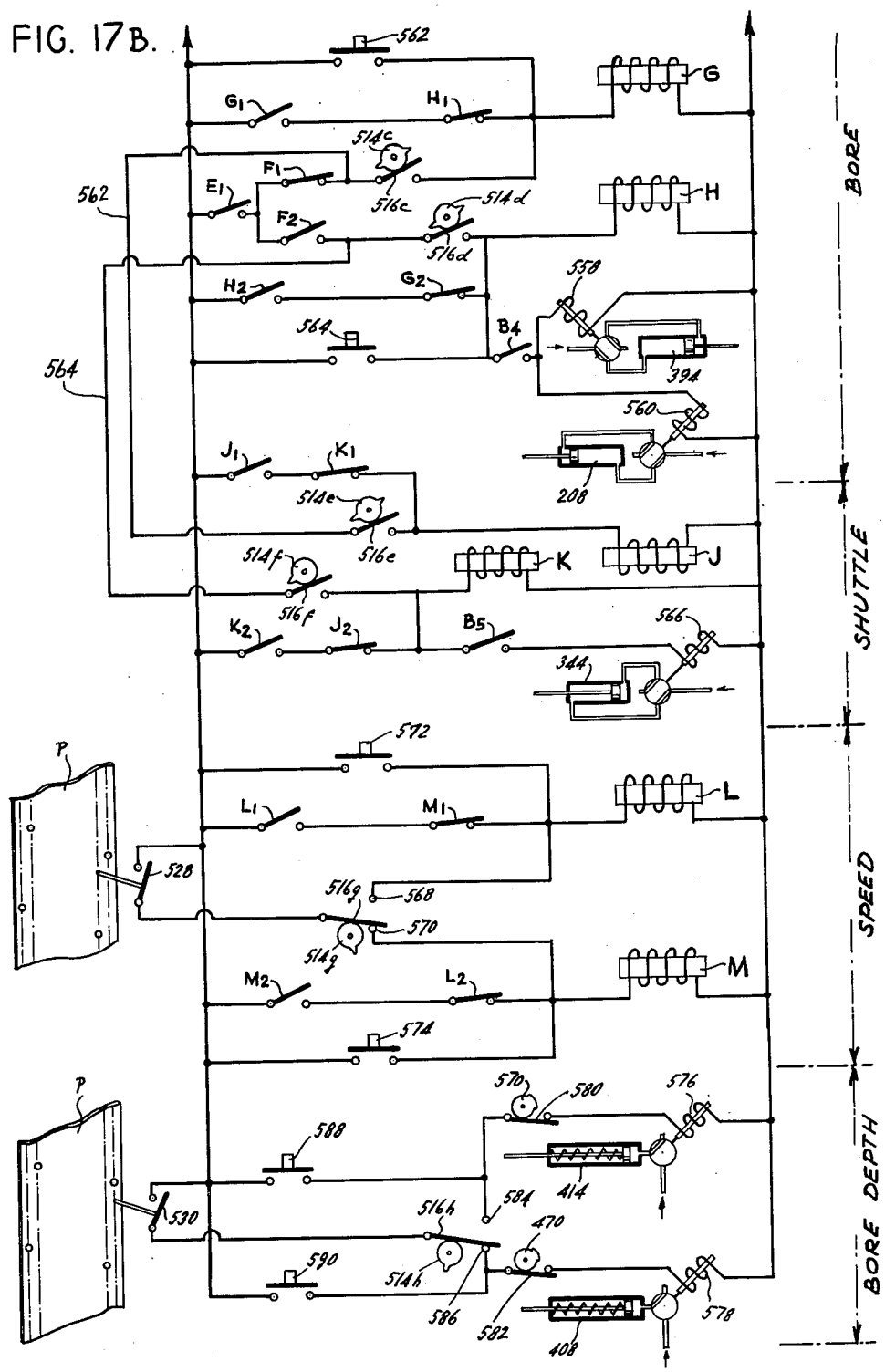

Referring now to FIGS. 17A and 17B, the schematic diagram of the control circuit and interrelation of the several stitchings mechanisms will be described.

For the purposes of illustration, the control tape or punching P has been shown as directly closing a series of electrical switches 524, 526, 528, 530 which respond to holes $p_1$ in the control tape or punching P. However, it will be appreciated that this simplified showing is intended to represent an automat of the Jacquard type operating on the Plauen or Zahn system wherein platinen respond to holes in the control tape or punching P and close respective electrical switches. Heretofore, the platinen which read out the information on the punching P actuated mechanical linkages for the control functions, but have been modified in accordance with the present invention to close the several switches for the controlling and coordinating functions. Except for this simplification, the automat operating on the Plauen or Zahn system is essentially conventional and accordingly its detailed illustration and description is dispensed with in the interests of simplicity and clarity.

The control circuit, which is illustrated in the form of a ladder diagram and energized from an appropriate source of alternating current 532, includes in succession a section for the needle control designated Needle, a section for the short stroke tension carrier control designated Blatt Stitch, a section for the bore control and long stroke tension carrier control designated Bore, a section for the shuttle control designated Shuttle, a section for fast and slow speed selection designated Speed, and a final section for the adjustment of the stroke of the bore points designated Bore Depth.

The Needle section includes an engaging relay A which, when energized, is effective via a solenoid control valve 534 to direct air to one side of the piston head of the double-acting piston and cylinder 120 which in turn moves the cam follower roller 80 onto the working cam 66 of the needle actuating and controlling mechanisms 62 (see FIG. 2). A disengaging relay B is effective via the solenoid control valve 534 and the double-acting piston and the cylinder 120 to direct air to the opposite side of the piston head for driving the cam follower roller 80 onto the idler cam 72. The position of the piston and cylinder 120 in the schematic diagram is purely illustrative, and it will be appreciated that the solenoid-controlled valve 534 is arranged to selectively introduce air to either side of the piston head thereof and port the other side thereof in accordance with the dictates of the control circuit.

As is generally understood in embroidery machines, certain functions thereof are performed in alternate cycles, which are known in the trade as the Mehr or M cycle and as the Weniger or W cycle. In this illustrative embodiment, the actuating and control mechanisms for the needle can only be engaged on the Mehr cycle and disengaged on the Weniger cycle. To this end, the timing shaft 506 carries a first timing cam 514a which actuates a timing switch 516a which alternately makes contact with terminals 536, 538. When the timing switch 516a is in contact with the terminal 536 in the Mehr cycle, an energization circuit is established for the engaging relay A across the line which is completed by the closing of the platinen control switch 524; and conversely on the Weniger cycle when the timing switch 516 is in contact with the terminal 538, a circuit is established for energizing the disengaging relay B which circuit is completed by the platinen control switch 524.

The relay A includes in the Needle section of the circuit, a first normally open contact $A_1$ in its energization circuit, and a second normally closed contact $A_2$ in the energization circuit for the relay B. Conversely, the relay B includes a first normally closed contact $B_1$ in the energization circuit for the relay A and a second normally open contact $B_2$ in its energization circuit in series with the normally closed contact $A_2$. Provision is made for manual energization of the relays A, B by the provision of push-buttons 540, 542 which respectively complete energization circuits.

In the illustrated circuit condition, the timing switch 516a engages terminal 538 and indicates that the control is on the Weniger cycle and that the relay B will be energized in response to the detection of a hole in the punching P by the switch 524. Energization of the relay B closes its contact $B_2$ and opens its normally closed contact $B_1$ which de-energizes the relay A which has been previously energized in that the cam follower roller was on the working cam of the actuating and control mechanisms and necessarily the relay A was energized. There is a momentary condition when both relays A and B are energized, but this condition is transient and does not interfere with the control function. Closing of the relay B completes a circuit over the normally closed contact $A_2$ of de-energized relay A and completes a holding circuit for the solenoid control valve 534 which was energized at the time of the establishment of the Weniger cycle by the timing cam 514a. The circuit condition will be maintained, with the actuating and controlling mechanisms for the needle disabled, despite opening of the platinen-controlled switch 524 and the timing switch 516a incident to further operation.

However, at such time as the platinen-controlled switch 524 responds to a hole $p_1$ in the punching indicating that the needle should be shifted onto the working cam (and the timing switch 516a is in contact with the terminal 536 to indicate a Mehr cycle), the relay A opens the contact $A_2$ to de-energize the relay B and to de-energize the solenoid control valve 534 which is effective to introduce air to the opposite side of the piston and cylinder 120 for the follower-shifting function. Further, relay A closes its contact $A_1$ to complete a holding circuit for the relay A over the closed contact $A_1$ and the normally closed contact $B_1$ of the de-energized relay B. It will be appreciated that the operator at any time during the cycle, may energize either of the relays A or B by depressing the corresponding push button 540, 542.

The Blatt Stitch section of the circuit includes two relays C, D, with the relay C being activated only on the Mehr cycle and the relay D being activated only on the Weniger cycle through the provision of the timing cam 514b which moves the timing switch 516b into contact with respective terminals 544, 546. The relays C, D are in controlling relation to a solenoid-controlled valve 548 which selectively activates the double-acting piston and cylinder 158 and the actuating and control mechanisms for the short stroke tension carrier (see FIGS. 4 and 5) which is effective to move the cam follower roller 132 out of contact with the working cam 128 for the short stroke tension carrier 46. The relay C includes a normally open contact $C_1$ in series with a normally closed contact $D_1$ of the relay D to complete an energization circuit for the relay C; and similarly the relay D includes a normally open contact $D_2$ in series with a normally closed contact $C_2$ of the relay C. Respective energization circuits are shunted by manual push-buttons 550, 552 for the selective manual energization of the relays C, D. In order to ensure that the relay C can only be energized at such times as the needle is operative, the relay A is provided with a normally open contact $A_3$ in series with the timing switch 516b and the platinen-controlled switch 526.

Assuming that the needle is working (contact $A_3$ closed), switch 526 has been actuated by its platinen in response to a hole, and the timing switch 516b contacts the terminal 546 on the Weniger cycle, the relay D will be energized to open the energization circuit for the relay C by opening contact $D_1$, with completion of its holding circuit by the closing of the contact $D_2$. Deenergization of the relay C is effective to disrupt the energization circuit for the solenoid-controlled valve 548 for the short control piston and cylinder 158, which energization circuit had previously been completed over the closed contact $C_1$ of the energized relay C, the normally closed contact $D_1$ of the relay D. Conversely, on the Mehr cycle, with the platinen-controlled switch 526 having been previously closed to signal that the pneumatic control 158 for the short stroke tension carrier should be activated, the relay C is energized, closing the contact $C_1$ and completing the energization circuit for the solenoid-controlled valve 548 and opening the normally closed contact $C_2$ to deenergize the relay D.

For certain applications, it may be desirable to completely deactivate the short stroke tension carrier and to this end there is provided in the series energization circuit with the normally-open contact $C_1$ and the normally-closed contact $D_1$, a manual disabling switch 554 which may be opened by the operator. For certain other applications, it may be desirable to continuously operate the short stroke tension carrier each time the needle is out (indicated by the relay contact $B_2$ being closed in response to energization of the relay B); and to this end there is provided a bypass switch 556 which may be closed to complete a shunting energization circuit for the solenoid-controlled valve 548 across the line in series with the switch contact $B_2$. It will of course be appreciated that when the shunting circuit is established by the closing of the switch 556, the disabling switch 554 must likewise be closed.

The Bore section of the ladder diagram includes relays E, F, G and H and their respective contacts which are effective to operate the actuating and control mechanism 380 for the boring points 30 by selectively energizing and deenergizing the solenoid-controlled valve 558 for the double-acting piston and cylinder 392 and the simultaneously activated and deactivated solenoid control valve 560 for the double-acting piston and cylinder 208 of the long stroke tension carrier 48. Relay F steps the memory ratchet 559 to selectively condition, in alternation, the energization circuits for the relays G and H. The relay G, when energized, is effective to shift the cam follower roller for the boring points onto the idler cam, while the relay H is effective to shift the cam follower roller from the idler cam onto the working cam, the boring mechanism being more fully disclosed and described in copending application Serial No. 714,254 filed February 10, 1958, now U.S. Pat. No. 2,950,694 of August 30, 1960 and assigned to the assignee of the present invention.

It will be appreciated that the memory ratchet 559 is required in the control circuit in that it is possible to shift the boring points 30 under the control of the punching P, irrespective of whether or not the machine is in the Mehr or Weniger cycle. The memory ratchet 559 selectively positions the contacts $F_1$, $F_2$ for each impulse imparted to the relay F. The ratchet control relay F is shunted by the further relay E which includes a normally open contact $E_1$ in series respectively with the shunt circuits provided over the contacts $F_1$, $F_2$. In series with the lead containing the contact $F_1$ is a timing switch 516c which is controlled by cam 514c on the timing shaft 506. Upon closing of the relay contact $E_1$ by the platinen control switch 526 and the energization of the relay E, an energization circuit is provided for the relay G over the contacts $E_1$ and $F_1$ and the switch 516c. Similarly, the relay H has an energization circuit including the contact $E_1$, the contact $F_2$ of the memory ratchet and timing switch 516d controlled by the timing cam 514d on the timing shaft 506. The relay G is provided with a holding circuit including a normally-open contact $G_1$ in series with normally-closed contact $H_1$ of the relay H. The relay H is provided with a holding circuit including the normally-open contact $H_2$ in series with the normally-closed contact $G_2$ of relay G. The respective holding circuits are shunted by manual push buttons 562, 564 for manual operation of the circuit.

In order to preclude operation of the boring mechanism unless the needle is deactivated, there is provided in series with the platinen-controlled switch 526 in the energization circuit for the relays E and F, a normally open relay contact $B_3$ of the relay B which is closed only when the relay B is energized, indicative of the needle actuating and control mechanisms being shifted onto the idler cam. Similarly, a further contact $B_4$ is provided in series with the solenoid-controlled valve 558 to avoid spurious operation.

At certain times in the operation it may be desirable to completely deactivate the boring points 30 and to simultaneously make it possible to operate the short stroke tension carrier control, irrespective of the condition of the needle as indicated by contact $A_3$ of relay A. To this end a double pole single throw switch 566 is provided which includes one switch blade 566a shunting the relay contact $A_3$ and another switch blade 566b in series with the energization circuit for the relays E, F controlled in the first instance by the switch 526.

In that the shuttle engages in the same cycle as the bore disengages, which may occur at any time in the machine operation, irrespective of the Mehr and Weniger cycles, the shuttle section of the ladder diagram derives its control over the leads 562, 564 connected in respective circuits from the platinen-controlled switch 526 over the switch $E_1$ and the respective switches $F_1$, $F_2$ of the memory device. This circuit section includes relays J, K which selectively energize and deenergize a solenoid-controlled valve 566 in controlling relation to the double-acting piston and cylinder 344 of the actuating and control mechanisms for the shuttle drive (see FIGS. 6 to 10 inclusive). The relay J is energized in response to energization of the relay E depending upon the condition of the memory ratchet 559 over a timing switch 516e which is controlled by the cam 514e on the timing shaft 506 via lead 562. The relay K is energized by the relay E over the memory device 559 via lead 564 and the timing switch 516f controlled from the timing cam 514f. Thus, it will be appreciated that there is provision for independent timing of the selective actuation of the shuttle drive, although the drive does operate in the same cycle as the boring device. The relay J is provided with a holding circuit including the normally-open contact $J_1$ and the normally-closed contact $K_1$ of the relay K, while the relay K is provided with a holding circuit including the normally-open contact $K_2$ and the normally-closed contact $J_2$ of the relay J.

In order to preclude deactivating the shuttle drive while the needle drive is still active and thereby insure that the shuttle drive will only disengage when the needle drive is disengaged, the relay B (which is energized when the needle drive is deactivated) is provided with a normally-open contact $B_5$ which closes upon energization of the relay B to condition the energization circuit for the solenoid-controlled valve 566. Thus, an effective lock-out is provided for precluding deactivation of the shuttle drive when the needle is operative and obviously requires the operation of the shuttle to complete the embroidery operation.

The Speed Control section of the ladder diagram includes relays L, M which have respective banks of contacts $L_3$, $L_4$, $L_5$ and $M_3$, $M_4$ and $M_5$ in the energization circuits for the motor 502 (see FIG. 16). In that the punchings are set for speed increase only in the Mehr cycle and speed decrease only in the Weniger cycle, there is provided a timing switch 516g controlled by a timing cam 514g which contacts the terminals 568, 570 in alternate cycles to selectively complete energization circuits for the relays L, M over the platinen-controlled switch 528. The relay L is provided with a holding circuit including the normally-open contact $L_1$ and the normally-closed contact $M_2$ of the relay M, while the relay M is provided with a holding circuit including a normally-open contact $M_2$ and a normally-closed contact $L_2$ of the relay L. In order to enable manual speed change irrespective of the cycle and independent of the platinen-controlled switch 528, there are provided manual control switches 572, 574 respectively providing direct connections for the relays L and M across the line. If the platinen-controlled switch 528 closes in response to the sensing of a hole indicative of a speed change, such speed change may be selectively achieved depending upon the cycle, as established by the Mehr and Weniger timing switch 516g.

The Bore Depth section of the ladder control diagram is relatively simple and is directly controlled from the switch 530 in that this function is achieved from the respective pneumatic controls 404, 406 by stepping associated stepping pawls. Thus, once the ratchets are stepped there is no need for the circuit to hold in to maintain the condition, and to this end the pneumatic controls are single-acting pistons and cylinders, with spring bias returns as previously described. The bore-stroke increasing piston and cylinder is driven through its operative stroke by a solenoid-controlled valve 576 and the bore-stroke decreasing piston and cylinder is driven through its operative stroke by the solenoid-controlled valve 578. In that the bore stroke adjustment is a stepwise function there are provided electrical lock-out switches 580, 582 which open at the limits of the permissible adjustment of the mechanism. Specifically, one end of the cam 470 opens a switch 580 when the maximum stroke adjustment has been reached, and the other end of the cam opens a switch 582 when the other limit of the stroke adjustment has been reached. The stepwise increase in the boring depth is to be achieved only in the Mehr cycle, while the stepwise decrease in the boring depth is to be achieved only in the Weniger cycle. To this end there is provided a timing switch 516h controlled from a timing cam 514h which switch selectively contacts terminals 584, 586 to alternately complete circuits for increasing and decreasing bore depth. Provision is made for directly making increases and decreases in bore depth by the manual push buttons 588, 590 which, upon being closed, complete direct energization circuits for the respective solenoid controlled valves 576, 578.

A latitude of modification, change and substitution is intended in the foregoing disclosure and in some instances some features of the invention will be employed without a corresponding use of other features. Accordingly, it is appropriate that the appended claims be construed broadly and in a manner consistent with the spirit and scope of the invention herein.

What we claim is:

1. An automatic shuttle embroidery machine comprising a support, a stitching tool, means mounting said stitching tool on said support for movement through a work cycle, and actuating and controlling mechanisms for moving said stitching tool including an actuating shaft rotatably mounted on said support, an actuating cam having camming surface secured to said actuating shaft and driven thereby, a further cam disposed adjacent to said actuating cam and having camming surfaces coinciding with a portion of the camming surfaces of said actuating cam, a cam follower, means operatively connecting said cam follower to said stitching tool, means mounting said cam follower for side to side shifting movement between positions in engagement respectively with said actuating cam and said further cam, electrically responsive pneumatic follower shifting means located adjacent to and operatively connected to said cam follower, and means including a remote control electrical sensing element adapted to respond to a punching for activating said follower shift means, and means electrically connecting said sensing element to said follower shift means for control of the latter by said punching.

2. An automatic shuttle embroidery machine comprising a support, a stitching tool, means mounting said stitching tool on said support for movement through a work cycle, and actuating and controlling mechanisms for moving said stitching tool including an actuating shaft rotatably mounted on said support, an actuating cam having camming surface secured to said actuating shaft and driven thereby, a further cam disposed adjacent to said actuating cam and having camming surfaces coinciding with a portion of the camming surfaces of said actuating cam, a cam follower, means operatively connecting said cam follower to said stitching tool, means mounting said cam follower for side to side shifting movement between positions in engagement respectively with said actuating cam and said further cam, a pneumatic follower shifting piston and cylinder located adjacent to and operatively connected to said cam follower, a remote electrical sensing element adapted to respond to a punching, electrically responsive actuating means operable under control of said electrical sensing element and connected to said piston and cylinder for selectively actuating said piston and cylinder and means electrically connecting said electrical sensing element in controlling relation to said actuating means.

3. In an automatic shuttle embroidery machine, a support, a stitching tool, means mounting said stitching tool on said support for movement through an operating cycle, and actuating and controlling mechanisms for moving said stitching tool through said cycle including an actuating shaft rotatably mounted on said support and adapted to be driven, first, second and third cams on said actuating shaft and driven thereby, said first and second cams being complementary to each other and having substantially identical camming surfaces with dwell and rise portions, said third cam being disposed adjacent to said first cam and having camming surfaces coinciding with at least a part of the dwell portion of said first cam, first and second cam followers, means operatively connecting said cam followers to said stitching tool, means mounting said first cam follower for lateral shifting movement between positions in engagement respectively with said first and third cams, means mounting said second cam follower in engagement with said second cam, electrically responsive pneumatic shifting means located adjacent to and operatively connected to said first cam follower, a remote control electrical sensing element adapted to respond to a punching, and means electrically connecting said electrical sensing element in controlling relation to said shifting means for laterally shifting said one cam follower between said positions.

4. In an embroidery machine, an actuating shaft, a stitching mechanism, cam means on said actuating shaft operatively connected to said stitching mechanism for actuating said stitching mechanism, a timing shaft, means operatively connected to and rotating said timing shaft in timed relation to rotation of said actuating shaft, electrically responsive control means for selectively enabling and disabling actuation of said stitching mechanism, and switching means controlled from said timing shaft for periodically disabling said control means.

5. In an embroidery machine, an actuating shaft, a stitching mechanism, cam means on said actuating shaft operatively connected to said stitching mechanism for actuating said stitching mechanism, a timing shaft, means operatively connected to and rotating said timing shaft in timed relation to rotation of said actuating shaft, electrically responsive control means for selectively enabling and disabling actuation of said stitching mechanism, sensing means adapted to respond to a remote control for activating said control means, and switching means controlled from said timing shaft for alternately disabling activation of said control means by said sensing means.

6. In an embroidery machine, an actuating shaft, a plurality of stitching mechanisms, respective cam means on said actuating shaft operatively connected to said stitching mechanisms for actuating said stitching mechanisms, a timing shaft, means operatively connected to and rotating said timing shaft at one half the rate of rotation of said actuating shaft, respective electrically responsive control means for selectively enabling and disabling actuation of said stitching mechanisms, and respective switching means controlled from said timing shaft for periodically disabling said control means.

7. In an embroidery machine, a support, an actuating shaft journaled on said support, a stitching tool, means mounting said stitching tool on said support for movement through a work cycle, actuating means including a least one cam on said actuating shaft operatively connected to said stitching tool for moving said stitching tool through said work cycle during each revolution of said actuating shaft, a timing shaft journaled on said support, means for rotating said timing shaft through one revolution in response to two revolutions of said actuating shaft, first control means for effectively coupling said actuating means to said stitching tool, second control means for effectively decoupling said actuating means from said stitching tool, a single sensing means adapted to respond to a punching, and means controlled from said timing shaft for connecting said sensing means to said first control means during alternate revolutions of said actuating shaft and to said second control means during the remaining revolutions of said actuating shaft for selectively actuating said first and second control means.

8. In an embroidery machine, a support, an actuating shaft journalled on said support, a stitching tool, means mounting said stitching tool on said support for movement through a work cycle, actuating means controlled from said actuating shaft and operatively connected to said stitching tool for moving said stitching tool through said work cycle, a timing shaft journalled on said support, means for rotating said timing shaft at one half the rate of said actuating shaft, control means for effectively coupling said actuating means to said stitching tool and for effectively decoupling said actuating means from said stitching tool, a single sensing means adapted to respond to a punching, and means controlled from said timing shaft for connecting said sensing means to said control means during alternate revolutions of said actuating shaft for selectively enabling said control means.

9. In an embroidery machine, a support, an actuating shaft journalled on said support, a stitching tool, means mounting said stitching tool on said support for movement through a work cycle, actuating means controlled from said actuating shaft and operatively connected to said stitching tool for moving said stitching tool through said work cycle, a timing shaft journalled on said support, means for rotating said timing shaft at a rate slower than said actuating shaft, control means for effectively coupling and decoupling said actuating means to said stitching tool, a sensing means adapted to respond to a punching, and means controlled from said timing shaft for periodically connecting said sensing means to said control means for selectively enabling said control means.

10. In an automatic shuttle embroidery machine, a support, a stitching tool mounted on said support for movement through a work cycle, an actuating mechanism operatively connected to said stitching tool for moving said stitching tool through said work cycle, a remote control including at least one electrical sensing element adapted to respond to a punching for deriving a control signal, electrically responsive pneumatic shift means contiguous to said actuating mechanism and removed from said remote control, means mechanically coupling said shift means to said actuating mechanism, an air-operated piston and cylinder, means coupling said piston to the mechanical coupling means, a solenoid controlled air valve for selectively admitting air into said cylinder, and solenoid-energizing means responsive to said control signal from said remote control and in controlling relation to said air valve for selectively admitting air into said cylinder.

11. In an automatic shuttle embroidery machine, a support, a stitching tool mounted on said support for movement through a work cycle, an actuating mechanism operatively connected to said stitching tool for moving said stitching tool through said work cycle, a remote control including at least one electrical sensing element adapted to respond to a punching for deriving a control signal, electrically responsive pneumatic shift means contiguous to said actuating mechanism and removed from said remote control, said shift means including a shift member mechanically coupled to said actuating mechanism, an air-operated piston and cylinder, means coupling said piston to said shift member, a solenoid controlled air valve for selectively admitting air into said cylinder, and solenoid-energizing means responsive to said control signal from said remote control and in controlling relation to said air valve for selectively admitting air into said cylinder to actuate said shift member.

12. In an automatic shuttle embroidery machine, a support, stitching means mounted on said support for movement through a work cycle, and actuating and controlling mechanisms for moving said stitching means including an actuating cam, a cam follower coupled to said stitching means, means mounting said cam follower for shifting movement into and out of engagement with said actuating cam, electrically responsive pneumatic follower shifting means located adjacent to and operatively connected to said cam follower, an electrical sensing element adapted to respond to a punching and disposed at a location remote from said follower shift means, and means connecting said electrical sensing element to said follower shift means for selectively actuating said follower shift means.

13. In an automatic shuttle embroidery machine according to claim 12, said electrically responsive pneumatic shift means including an air cylinder, a piston mounted within said cylinder for reciprocation, a shifting member engaging said cam follower and coupled to said piston, a solenoid controlled valve for selectively admitting air into said cylinder, and relay means responsive to said sensing element and in controlling relation to said valve for selectively admitting air into said cylinder for actuating said shifting member.

14. In an automatic embroidery machine according to claim 13, said air cylinder and piston being double acting and said shifting member being forked and engaging opposite sides of said cam follower.

15. An automatic shuttle embroidery machine comprising a support, a stitching tool mounted on said support for movement through a work cycle, and actuating and controlling mechanisms for moving said stitching tool through said work cycle including an actuating shaft rotatably mounted on said support, an actuating cam secured to said actuating shaft and driven thereby, a cam follower coupled to said stitching tool, means mounting said cam follower for shifting movement into and out of engagement with said actuating cam, electrically responsive pneumatic follower shifting means located adjacent to and operatively connected to said cam follower, said pneumatic follower shift means including a double-acting piston and cylinder, a solenoid controlled valve for selectively admitting air to said cylinder, and means connecting said piston to said cam follower, a remote control electrical sensing element adapted to respond to a punching, and means responsive to said electrical sensing element and controlling said valve for selectively actuating said piston of said follower shift means.

16. An automatic shuttle embroidery machine comprising a support, a stitching tool, means mounting said stitching tool on said support for movement through a work cycle, and actuating and controlling mechanisms for moving said stitching tool including an actuating shaft rotatably mounted on said support, an actuating cam operatively connected to said actuating shaft and driven thereby, a further cam disposed adjacent to said actuating cam and having camming surfaces coinciding with a portion of the camming surfaces of said actuating cam, a cam follower, means mounting said cam follower for side to side shifting movement between operative and inoperative positions in engagement respectively with said actuating cam and said further cam, a remote control including a sensing element adapted to respond to a punching, and electrically responsive air-operated shifting means located adjacent to said cam follower and controlled from said remote control for periodically moving said cam follower between said operative and inoperative position, said shifting means including a double-acting piston and cylinder, a shifting member engaging said cam follower, means connecting said piston to said shifting member, a solenoid controlled valve for selectively admitting air into said cylinder, and means responsive to said remote control for energizing said solenoid controlled valve.

17. An automatic shuttle embroidery machine comprising a support, a stitching tool, means mounting said stitching tool on said support for movement through an operating cycle, and actuating and controlling mechanisms for moving said stitching tool through said cycle including an actuating shaft rotatably mounted on said support and adapted to be driven, first, second and third cams on said actuating shaft and driven thereby, said first and second cams being complementary to each other and having substantially identical camming surfaces, said third cam being disposed adjacent to said first cam and having camming surfaces coinciding with at least a part of the camming surfaces of said first cam, first and second cam followers, means mounting said first cam follower for shifting movement between operative and inoperative positions in engagement respectively with said first and third cams, means mounting said second cam follower in engagement with said second cam, a remote control adapted to respond to a punching, a piston and cylinder, a shifting member located adjacent to and engaging said cam follower, means connecting said piston to said shifting member, a valve for selectively admitting air into said cylinder, and means responsive to said remote control for controlling said valve.

18. An automatic shuttle embroidery machine comprising a support, a stitching tool, means mounting said stitching tool on said support for movement through an operating cycle, and actuating and controlling mechanisms for moving said stitching tool through said cycle including an actuating shaft rotatably mounted on said support and adapted to be driven, first, second and third cams on said actuating shaft and driven thereby, said first and second cams being complementary to each other and having substantially identical camming surfaces with dwell and rise portions, said third cam being disposed adjacent to said first cam and having camming surfaces coinciding with at least a part of the dwell portion of said first cam, first and second cam followers, means mounting said first cam follower for lateral shifting movement between operative and inoperative positions in engagement respectively with said first and third cams, means mounting said second cam follower in engagement with said second cam, a remote control including a sensing element adapted to respond to a punching, a double-acting piston and cylinder, a shifting member located adjacent to and engaging said cam follower, means connecting said piston to said shifting member, a solenoid controlled valve for selectively admitting air into said cylinder, and means responsive to said remote control for energizing said solenoid controlled valve.

19. An automatic shuttle embroidery machine comprising a support, a stitching tool, means mounting said stitching tool on said support for movement through a work cycle, and actuating and controlling mechanisms for moving said stitching tool including an actuating shaft rotatably mounted on said support, an actuating cam having camming surface secured to said actuating shaft and driven thereby, a cam follower coupled to said stitching tool, means mounting said cam follower for shifting movement into and out of engagement with said actuating cam, electrically responsive pneumatic follower shifting means operatively connected to said cam follower, electrical sensing means adapted to respond to a punching, electromagnetic means controlled from said electrical sensing means and controlling said follower shifting means for selectively actuating said follower shift means, a timing shaft, means operatively connected to and rotating said timing shaft in timed relation to rotation of said actuating shaft, and means controlled from said timing shaft for selectively enabling and disabling said electromagnetic means.

20. An automatic shuttle embroidery machine according to claim 19 wherein said electrically responsive pneumatic shifting means includes an air cylinder, a piston mounted within said cylinder for reciprocation, a shifting member engaging said cam follower and coupled to said piston and a solenoid controlled valve for selectively admitting air into said cylinder.

21. An automatic shuttle embroidery machine comprising a support, a stitching tool, means mounting said stitching tool on said support for movement through an operating cycle, and actuating and controlling mechanisms for moving said stitching tool through said cycle including an actuating shaft rotatably mounted on said support and adapted to be driven, first, second and third cams on said actuating shaft and driven thereby, said first and second cams being complementary to each other and having substantially identical camming surfaces with dwell and rise portions, said third cam being disposed adjacent to said first cam and having camming surfaces coinciding with at least a part of the dwell portion of said first cam, first and second cam followers, means mounting said first cam follower for lateral shifting movement between positions in engagement respectively with said first and third cams, means mounting said second cam follower in engagement with said second cam, electrically responsive pneumatic shifting means operatively connected to said first cam follower, control means including a remote control electrical sensing element adapted to respond to a punching and in controlling relation to said pneumatic shifting means for laterally shifting said one cam follower between said positions, a timing shaft, means operatively connected to said timing shaft for rotating said timing shaft in timed relation to rotation of said actuating shaft, and means controlled from said timing shaft for selectively enabling and disabling said control means.

22. An automatic shuttle embroidery machine according to claim 21 wherein said electrically responsive pneumatic shifting means includes an air cylinder, a piston mounted within said cylinder for reciprocation, a shifting member engaging said one cam follower and coupled to said piston, and a solenoid controlled valve for selectively admitting air into said cylinder.

References Cited in the file of this patent

UNITED STATES PATENTS

| | | |
|---|---|---|
| 1,896,517 | Johnson | Feb. 7, 1933 |
| 2,030,495 | Bretschneider | Feb. 11, 1936 |
| 2,649,065 | Casper | Aug. 18, 1953 |
| 2,803,207 | Sotzky | Aug. 20, 1957 |
| 2,950,694 | Siegel | Aug. 30, 1960 |